US007369959B2

(12) United States Patent
Evans

(10) Patent No.: US 7,369,959 B2
(45) Date of Patent: *May 6, 2008

(54) FLUID CATALYTIC CRACKING CATALYST INJECTION SYSTEM AND METHOD FOR COMMUNICATING WITH SAME

(75) Inventor: Martin Evans, Tolland, CT (US)

(73) Assignee: Intercat Equipment, Inc., Manasquan, NJ (US)

( * ) Notice: Subject to any disclaimer, the term of this patent is extended or adjusted under 35 U.S.C. 154(b) by 223 days.

This patent is subject to a terminal disclaimer.

(21) Appl. No.: 11/283,227

(22) Filed: Nov. 18, 2005

(65) Prior Publication Data

US 2006/0074571 A1 Apr. 6, 2006

Related U.S. Application Data

(63) Continuation-in-part of application No. 10/859,032, filed on Jun. 2, 2004, which is a continuation-in-part of application No. 10/304,670, filed on Nov. 26, 2002, now Pat. No. 7,050,944, and a continuation-in-part of application No. 10/320,064, filed on Dec. 16, 2002, now Pat. No. 6,859,759, which is a continuation-in-part of application No. 10/374,450, filed on Feb. 26, 2003, now Pat. No. 6,974,559.

(51) Int. Cl.
*G06F 7/04* (2006.01)

(52) U.S. Cl. ............... 702/122; 702/188; 702/30; 702/182; 702/183

(58) Field of Classification Search ............... 702/122, 702/188, 182, 183, 30; 422/110, 105, 107, 422/108, 111, 112

See application file for complete search history.

(56) References Cited

U.S. PATENT DOCUMENTS 4,054,784 A  10/1977  Ricciardi et al.
4,219,407 A   8/1980  Haddad et al.

(Continued)

FOREIGN PATENT DOCUMENTS

EP    0 408 606    9/1993

(Continued)

OTHER PUBLICATIONS

"Corn Starch Batching System", Corn Starch & Liquids Blending System for Atochem—Buffalo, NY (Job #1193D), TOPDOC-AB5 by Tele-Denken Resources, Inc. 2.25, created Jun. 22, 1992, printed Jun. 22, 1992, pp. 42-51, 31-34, 64 and 66.

(Continued)

*Primary Examiner*—John Barlow
*Assistant Examiner*—Hien Vo
(74) *Attorney, Agent, or Firm*—Tanzina Chowdhury, Esq.; Keith Taboada; Patterson & Sheridan, LLP

(57) ABSTRACT

A method and apparatus for metering catalyst to a fluid catalytic cracking catalyst unit are provided. In one embodiment, an apparatus for metering catalyst to a fluid catalytic cracking catalyst unit includes a low pressure storage vessel coupled to a pressure vessel by a metering device. A controller is provided to control catalyst transfers between the storage and pressure vessels. The control is configured to facilitate event and catalyst inventory information with local and remote devices.

22 Claims, 15 Drawing Sheets

U.S. PATENT DOCUMENTS

| | | |
|---|---|---|
| 4,368,114 A | 1/1983 | Chester et al. |
| 4,371,499 A | 2/1983 | Bard et al. |
| 4,416,765 A | 11/1983 | Chester et al. |
| RE32,101 E | 4/1986 | Ricciardi et al. |
| 4,810,360 A | 3/1989 | Haddad et al. |
| 4,927,523 A | 5/1990 | Donnelly |
| 4,927,526 A | 5/1990 | Anderson et al. |
| 4,994,173 A | 2/1991 | Tai-Sheng et al. |
| 5,081,600 A | 1/1992 | Tump |
| 5,215,653 A | 6/1993 | Nelson et al. |
| 5,260,880 A | 11/1993 | Tump |
| 5,357,306 A | 10/1994 | Skye et al. |
| 5,389,236 A | 2/1995 | Bartholic et al. |
| 5,454,918 A | 10/1995 | Javadi et al. |
| 5,785,934 A | 7/1998 | Jacobs et al. |
| 5,810,045 A | 9/1998 | Evans |
| 6,013,158 A | 1/2000 | Wootten |
| 6,358,401 B1 | 3/2002 | Evans |
| 6,859,759 B2 | 2/2005 | Evans |
| 6,974,559 B2 * | 12/2005 | Evans ........................ 422/110 |
| 7,050,944 B2 | 5/2006 | Evans |
| 2003/0089426 A1 | 5/2003 | Poor et al. |

FOREIGN PATENT DOCUMENTS

| | | |
|---|---|---|
| WO | WO 89/07487 | 8/1989 |
| WO | WO 2005/0095549 A2 | 10/2005 |

OTHER PUBLICATIONS

"IMS to Control Room", Dwg. S-29, Sheet 1, Intercat, Savannah, Georgia, Nov. 26, 2001.

Everlasting Valve Company, www.everlastingvalveco.com, printed Feb. 6, 2003.

ADPI C-Engine, www.adpi.com/C-Engine.htm, printed Nov. 15, 2002.

* cited by examiner

FLUID CATALYTIC CRACKING CATALYST INJECTION SYSTEM AND METHOD FOR COMMUNICATING WITH SAME

CROSS-REFERENCE TO RELATED APPLICATIONS

This application is a continuation-in-part of U.S. patent application Ser. No. 10/859,032, filed Jun. 2, 2004, which is a continuation-in-part of U.S. patent application Ser. No. 10/304,670, filed Nov. 26, 2002 now U.S. Pat. No. 7,050,944 and which is a continuation-in-part of U.S. patent application Ser. No. 10/320,064, filed Dec. 16, 2002 and now U.S. patent Ser. No. 6,859,759, issued Feb. 22, 2005. This application is also a continuation-in-part of U.S. patent application Ser. No. 10/374,450, filed Feb. 26, 2003 now U.S. Pat. No. 6,974,559. All of the above identified applications are hereby incorporated by reference in their entities.

BACKGROUND OF THE INVENTION

1. Field of the Invention

Embodiments of the invention generally relate to a fluid catalytic cracking catalyst injection system and method for communicating with same.

2. Description of the Related Art

FIG. 1 is a simplified schematic of one embodiment of a conventional fluid catalytic cracking system 130. The fluid catalytic cracking system 130 includes a fluid catalytic cracking (FCC) unit 110 coupled to a catalyst injection system 100, an oil feed stock source 104, an exhaust system 114 and a distillation system 116. One or more catalysts from the catalyst injection system 100 and oil from the oil feed stock source 104 are delivered to the FCC unit 110. The oil and catalysts are combined to produce an oil vapor that is collected and separated into various petrochemical products in the distillation system 116. The exhaust system 114 is coupled to the FCC unit 110 and is adapted to control and/or monitor the exhausted byproducts of the fluid cracking process.

The catalyst injection system 100 may include a main catalyst injector 102 and one or more additive injectors 106. The main catalyst injector 102 and the additive injector 106 are coupled to the FCC unit 110 by a process line 122. A fluid source, such as a blower or air compressor 108, is coupled to the process line 122 and provides pressurized fluid, such as air, that is utilized to carry the various powdered catalysts from the injectors 102, 106 through the process line 122 where they are combined with oil from the oil feed stock source 104 and delivered into the FCC unit 110.

FIG. 2 is one embodiment of a conventional additive injector 106. The additive injector 106 includes a pressure vessel 220 and a low pressure storage vessel 240. The pressure vessel 220 is coupled to one or more load cells 210 for weighing the catalyst that will be introduced into the FCC unit 110 through the process line 122. In operation, the catalyst is dispensed into the pressure vessel 220 at atmospheric pressure from the low pressure storage vessel 240. The pressure vessel 220 is subsequently weighed to determine the amount of catalyst loaded therein. The pressure vessel 220 is then pressurized by a pressure control device 228 coupled to the vessel 220 to a level that facilitates movement of the pressurized catalyst into process line 122 and then into the FCC unit 110. If the pressure vessel 220 is supported by any of the structural components surrounding it, other than the load cells 210 (such as pipes, electrical conduits, and the like), those components will prevent the load cells 210 from accurately measuring the weight of catalyst added to the pressure vessel 220, and ultimately into the FCC unit 100. Therefore, in order to obtain a reasonably accurate measure of the catalyst, the pressure vessel 220 must not be supported by other components of the system.

To isolate the pressure vessel 220 from the components coupled thereto, flexible connectors, such as bellows 230, are used to couple the pressure vessel 220 to the low pressure vessel 240, the process line 122, and other surrounding components. The bellows 230 allow the pressure vessel 220 to "float" on the load cells 210 so a more accurate reading may be obtained. However, use of flexible bellows 230 does not reliably insure accurate weight measurement of the pressure vessel 220. For example, the weight of the pressure vessel 220 is still slightly supported by the flexible bellows 230—a problem compounded by the fact that a plurality of bellows 230 must be utilized to isolate the pressure vessel 220 from the various components coupled thereto. Therefore, the determination of the weight of the catalyst added to the pressure vessel 220 is still not accurate. Moreover, due to the operating pressures and potentially explosive atmosphere, bellows meeting operational standards are quite expensive and wear quickly, resulting in the drift of weight readings, catalyst dust leaks and associated environmental issues, as well as necessitating costly process downtime and bellows replacement.

FIG. 3 is another embodiment of an additive injector 300. The injector 300 includes a high pressure storage vessel 340 coupled by a metering valve 330 to the process line 122. The metering valve 330 may be actuated to allow a predefined amount of catalyst to be introduced into the process line 122 and combine with the oil from the oil feed stock source 104 before entering the FCC unit 110. The high pressure storage vessel 340 contains a bulk supply of catalyst, for example, from about 1 to about 20 tons of catalyst, and is maintained at a pressure between about 50 to about 60 pounds per square inch (psi) by a pressure control device 320. As such, the pressure vessel 340 is subject to regulatory construction standards which cause the vessel to be relatively expensive as compared to a comparably sized, low pressure storage vessel. The high pressure vessel 340 is coupled to a plurality of load cells 310 which enable the weight of the high pressure storage vessel 340 to be determined. The weight of the catalyst injected is determined by comparing the weight of the high pressure storage vessel 340 before and after catalyst injection.

Metering catalyst in the manner described with reference to FIG. 3 eliminates the need for bellows used to isolate the pressure vessel. However, large high pressure storage vessels are very expensive. Therefore, there is a need for a method and apparatus for metering catalyst in a fluid catalytic cracking catalyst injection system that minimizes the cost of ownership. Moreover, there is a need for a method and apparatus for communication with such a device.

SUMMARY OF THE INVENTION

A fluid catalytic cracking catalyst injection system and method for communicating with same are provided. In one embodiment, system includes a low pressure storage vessel coupled to a pressure vessel that defines a high pressure side of the system where the determination of the amount of catalyst transferred is made on the low pressure side of the system. A controller is provided to communicate information derived from the operation of the system. Information communicated may include catalyst inventory information and/or operational events of the system.

DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

Figure 1:
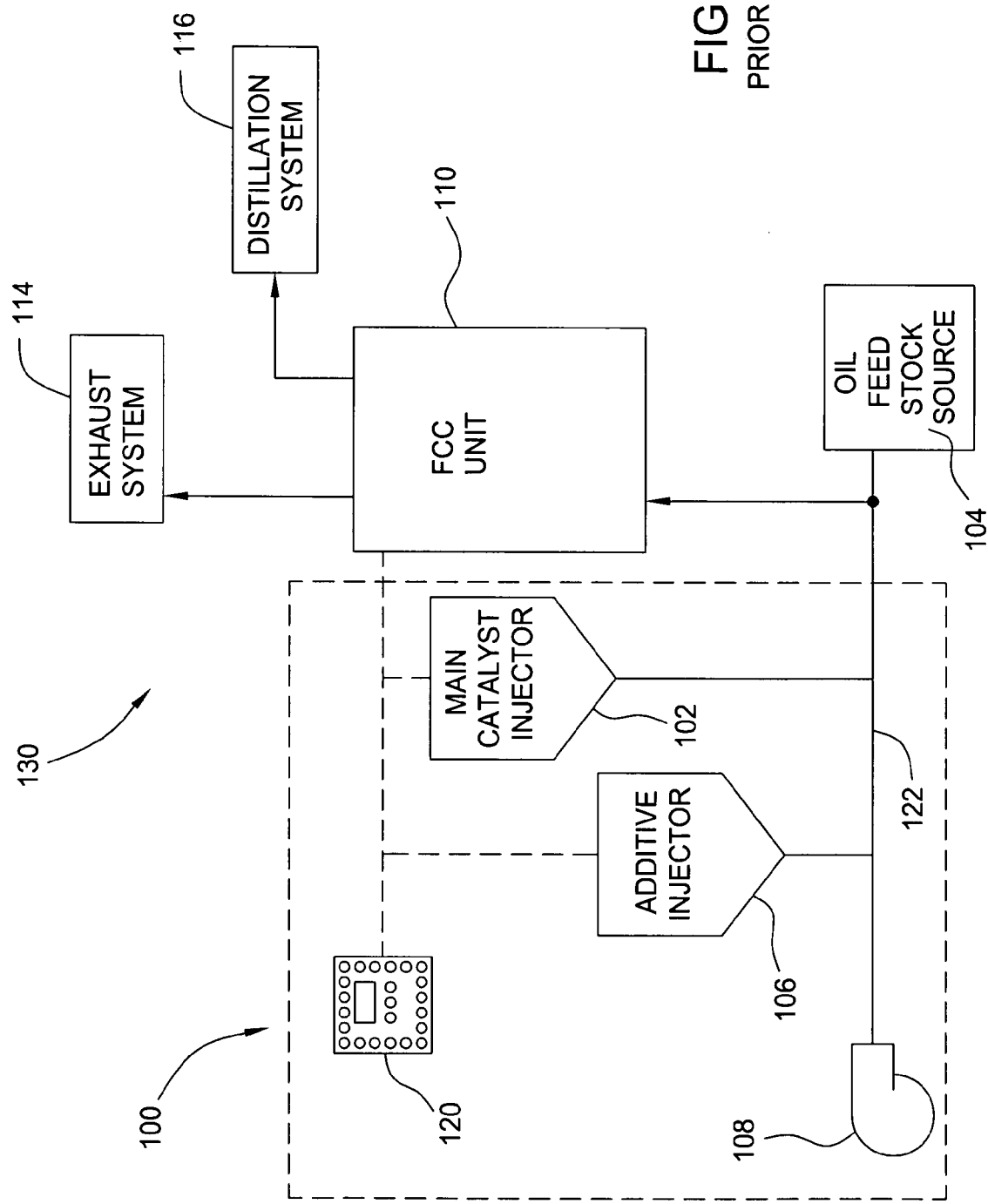
FIG. 1 is a simplified schematic view of a conventional fluid catalytic cracking system.
Figure 2:
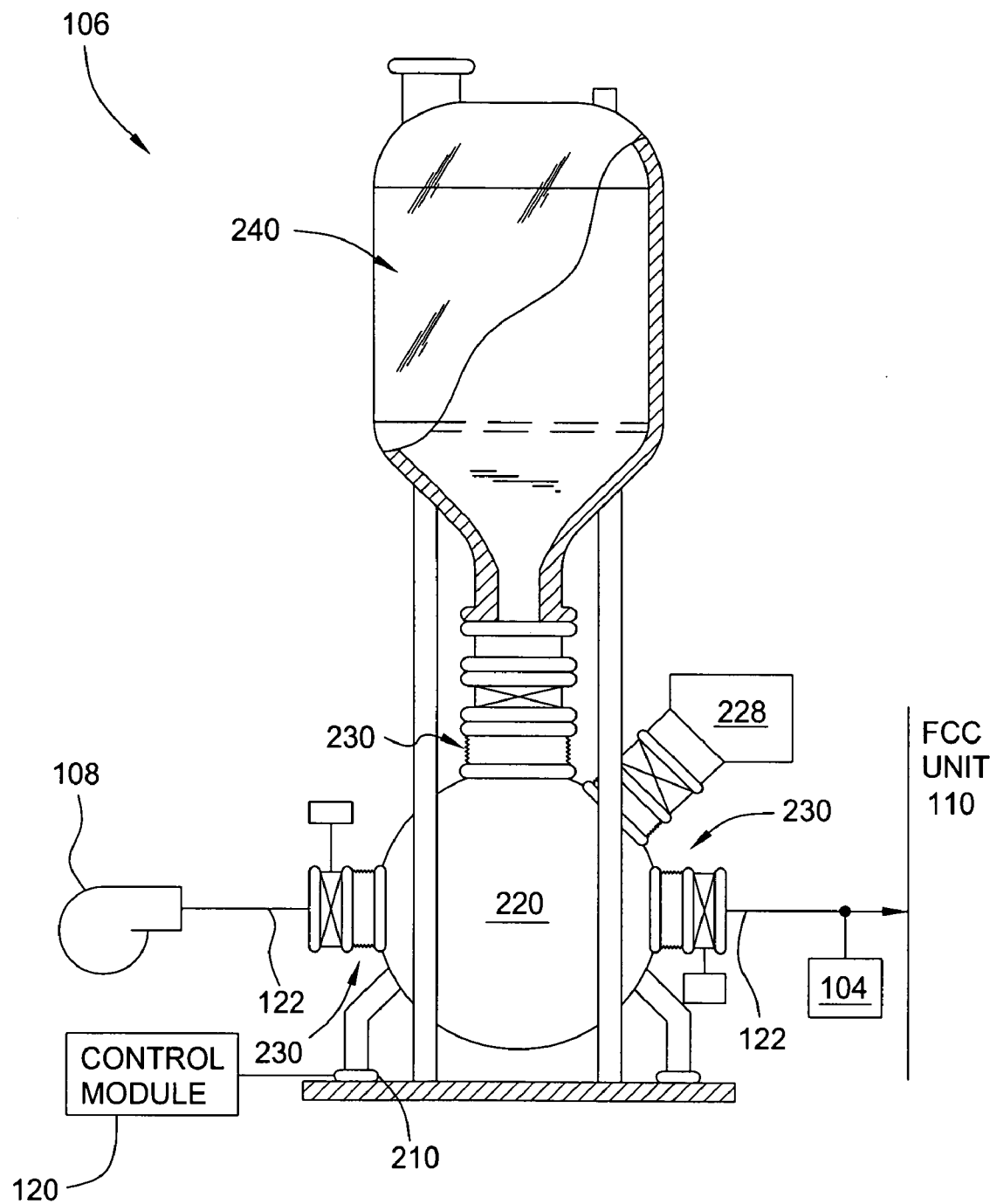
FIG. 2 is a simplified elevation view of one embodiment of a conventional catalyst injector having a low pressure storage vessel.
Figure 3:
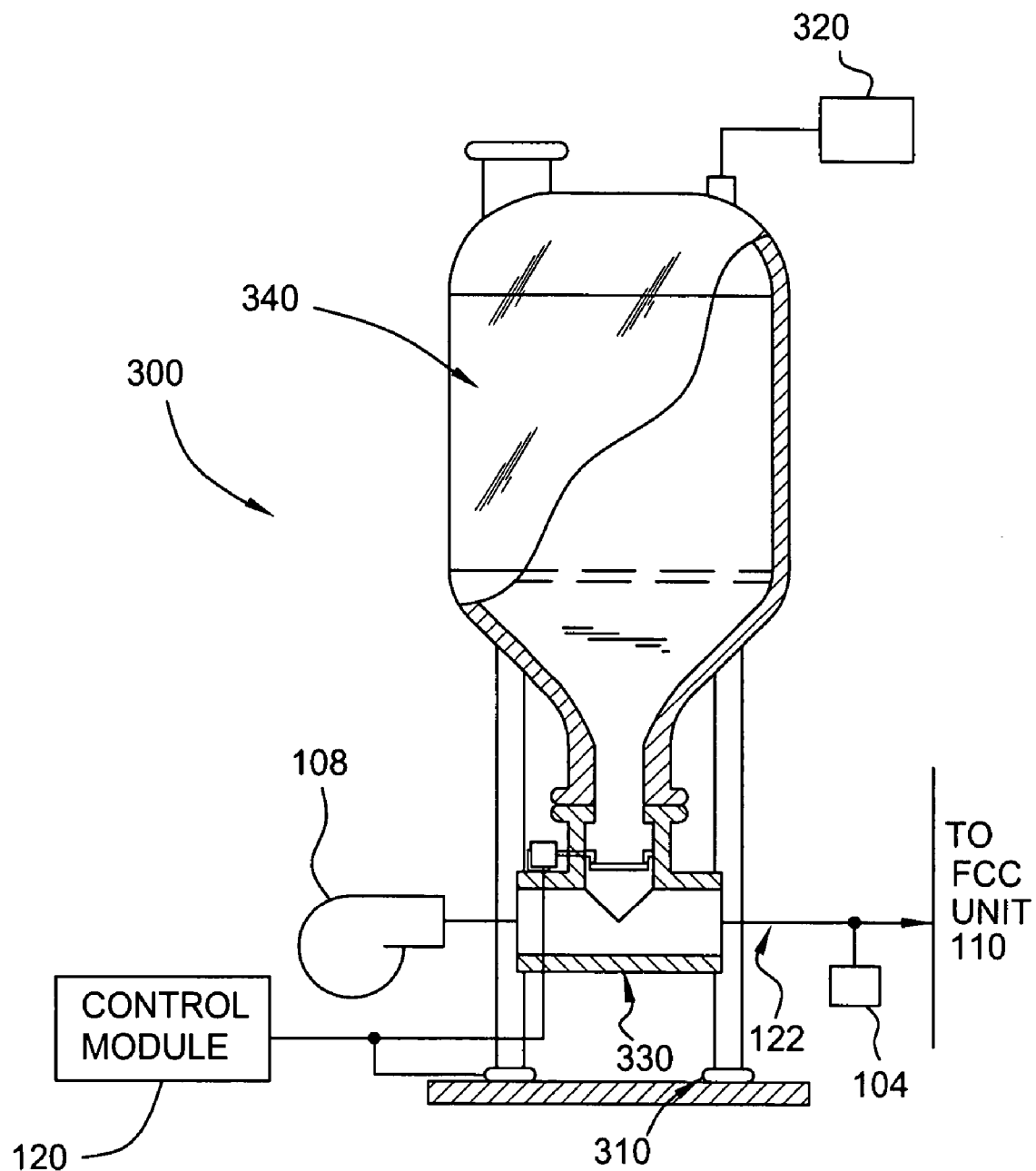
FIG. 3 is a simplified elevation view of another embodiment of a conventional catalyst injector having a high pressure storage vessel.

To facilitate understanding, identical reference numerals have been used, wherever possible, to designate identical elements that are common to the figures. It is contemplated that elements and features of one embodiment may be beneficially incorporated in other embodiments without further recitation.

DETAILED DESCRIPTION

Figure 4:
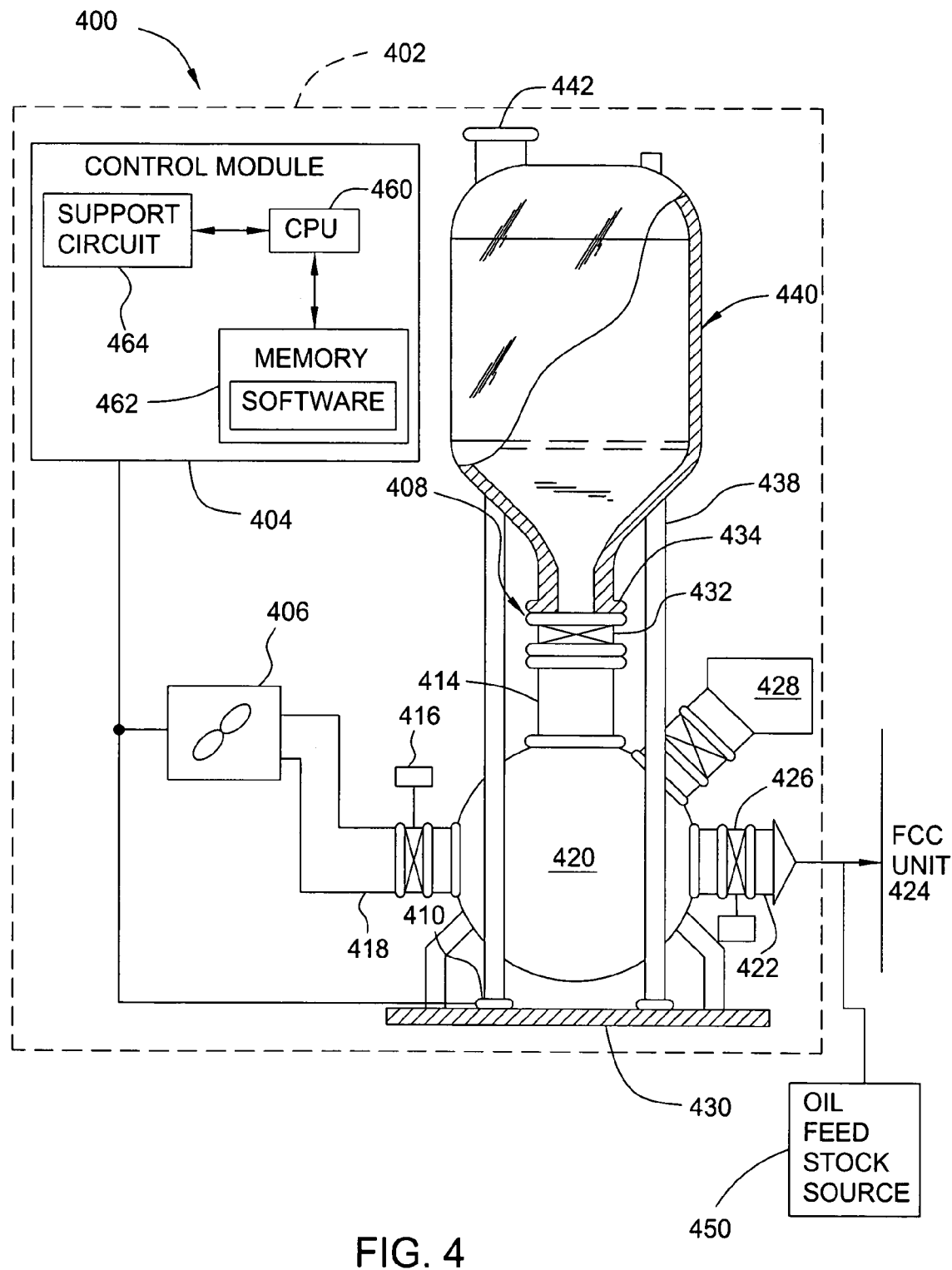
FIG. 4 is a simplified elevation view of a fluid catalytic cracking system illustrating a catalyst metering system in accordance with one embodiment of the present invention.

FIG. 4 depicts one embodiment of a fluid catalytic cracking (FCC) system 400 comprising an injection system 402 and oil feed stock source 450 coupled to an FCC unit 424. The FCC unit 424 is adapted to promote catalytic cracking of petroleum feed stock provided from the source 450 and may be configured in a conventional manner. The injection system 402 is coupled to the FCC unit 424 and is configured to inject one or more catalysts into the FCC unit 424 to control processing attributes such as the ratio of products recovered in a distiller of the FCC unit 424 and/or to control the emissions from the FCC unit 424. The injection system 402 includes a control module 404 to control the rates and/or amounts of catalyst provided to the FCC unit 424 by the injection system 402.

The control module 404 may include any form of computer processor that can be used in an industrial setting for controlling various chambers and subprocessors. In one embodiment, the control module 404 includes a programmable logic controller (PLC), such as those available from GE Fanuc. However, from the disclosure herein, those skilled in the art will realize that other control modules such as microcontrollers, microprocessors, programmable gate arrays, and application specific integrated circuits (ASICs) may be used to perform the controlling functions of the control module 404. One control module 404 that may be adapted to benefit from the invention is described in the previously incorporated U.S. patent applications Ser. Nos. 10/304,670 and 10/320,064, which are described with reference to FIGS. 9-10, which enables a method of monitoring catalyst inventory as described with reference to FIGS. 11-15, all of which are discussed further below.

In one embodiment, the injection system 402 includes a storage vessel 440 coupled to a pressure vessel 420 by a metering device 408. The metering device 408 is coupled to the control module 404 so that an amount of catalyst delivered to the FCC unit 424 may be monitored and/or metered. The storage vessel 440 is a container adapted to store catalyst therein at substantially atmospheric pressures and has an operational pressure of between about zero to about 30 pounds per square inch. The storage vessel 440 has a fill port 442 and a discharge port 434. The discharge port 434 is typically positioned at or near a bottom of the storage vessel 440.

The metering device 408 is coupled to the discharge port 434 to control the amount of catalyst transferred from the storage vessel 440 to the pressure vessel 420 through a catalyst delivery line 414. The metering device 408 may be a shut-off valve, rotary valve, mass flow controller, pressure vessel, flow sensor, positive displacement pump, or other device suitable for regulating the amount of catalyst dispensed from the storage vessel 440 into the pressure vessel 420 for injection into the FCC unit 424. The metering device 408 may determine the amount of catalyst supplied by weight, volume, time of dispense, or by other means. Depending on the catalyst requirements of the FCC system 400, the metering device 408 may be configured to provide from about 5 to about 4000 pounds per day of additive-type catalysts (process control catalyst) or may be configured to provide from about 1 to about 20 tons per day of main catalyst. The metering device 408 typically delivers catalysts over the course of a planned production cycle, typically 24 hours, in multiple shots of predetermined amounts spaced over the production cycle. However, catalysts may also be added in an "as needed" basis. In the embodiment depicted in FIG. 4, the metering device 408 is a control valve 432 that regulates the amount of catalyst delivered from the storage vessel 440 to the FCC unit 424 by a timed actuation. Control valves suitable for use as a metering device are available from InterCat Equipment Inc., located in Sea Girt, N.J.

The injection system 402 may also include one or more sensors for providing a metric suitable for determining the amount of catalyst passing through the metering device 408 during each transfer of catalyst to the pressure vessel 420.

The sensors may be configured to detect the level (i.e., volume) of catalyst in the storage vessel 440, the weight of catalyst in the storage vessel 440, the rate of catalyst movement through the storage vessel 440, discharge port 434, metering device 408, and/or catalyst delivery line 414, or the like.

In the embodiment depicted in FIG. 4, the sensor is a plurality of load cells 410 adapted to provide a metric indicative of the weight of catalyst in the storage vessel 440. The load cells 410 are respectively coupled to a plurality of legs 438 that support the storage vessel 440 above a mounting surface 430. Each of the legs 438 has one of the plurality of load cells 410 coupled thereto. From sequential data samples obtained from the load cells 410, the control module 404 may resolve the net amount of transferred catalyst after each actuation of the metering device 408 (e.g., the control valve 432). Additionally, the cumulative amount of catalyst dispensed over the course of the production cycle may be monitored so that variations in the amount of catalyst dispensed in each individual cycle may be compensated for by adjusting the delivery attributes of the metering device 408, for example, by changing the open time of the control valve 432 to allow more (or less) catalyst to pass therethrough and into the pressure vessel 420 for ultimate injection into the FCC unit 424.

Alternatively, the sensor may be a level sensor (not shown) coupled to the storage vessel 440 and adapted to detect a metric indicative of the level of catalyst within the storage vessel 440. The level sensor may be an optical transducer, a capacitance device, a sonic transducer or other device suitable for providing information from which the level or volume of catalyst disposed in the storage vessel 440 may be resolved. By utilizing sensed differences in the levels of catalyst disposed within the storage vessel 440 between dispenses, the amount of catalyst injected may be resolved for a known storage vessel geometry.

Alternatively, the sensor may be a flow sensor (not shown) adapted to detect the flow of catalyst through one of the components of the catalyst injection system 402. The flow sensor maybe a contact or non-contact device and may be mounted to the storage vessel 440 or the catalyst delivery line 414 coupling the storage vessel 440 to the pressure vessel 420. For example, the flow sensor may be a sonic flow meter or capacitance device adapted to detect the rate of entrained particles (i.e., catalyst) moving through the catalyst delivery line 414.

Although the injection system 402 described above is shown configured to provide catalyst from a single low pressure storage vessel 440, the invention contemplates utilizing one or more injection systems coupled to the FCC unit 424 to introduce multiple catalysts from a plurality of storage vessels. Each of these injection systems may be controlled by either common or independent control modules.

The pressure vessel 420 is rigidly coupled to the mounting surface 430, as load cells are not needed to determine the weight of the pressure vessel 420. The term "rigidly" is to include mounting devices, such as vibration dampers and the like, but to exclude mounting devices that "float" the pressure vessel to facilitate weight measurement thereof. The pressure vessel 420 has an operational pressure of about 0 to about 100 pounds per square inch, and is coupled to a fluid source 406 by a first conduit 418. The first conduit 418 includes a shut-off valve 416 that selectively isolates the fluid source 406 from the pressure vessel 420. A second conduit 422 couples the pressure vessel 420 to the FCC unit 424 and includes a second shut-off valve 426 that selectively isolates the pressure vessel 420 substantially from the FCC unit 424. The shut-off valves 416 and 426 are generally closed to allow the pressure vessel 420 to be filled with catalyst from the storage vessel 440 at substantially atmospheric pressure.

Once the catalyst is dispensed into the pressure vessel 420, the control valve 432 is closed and the interior of the pressure vessel 420 is pressurized by a pressure control system 428 to a level that facilitates injection of the catalyst from the pressure vessel 420 into the FCC unit 424, typically at least about 20 pounds per square inch. After the loaded pressure vessel 420 is pressurized by the pressure control system 428, the shut-off valves 416 and 426 are opened, allowing air or other fluid provided by the fluid source 406 to enter the pressure vessel 420 through the first conduit 418 and carry the catalyst out of the pressure vessel 420 through the second conduit 422 to the FCC unit 424. In one embodiment, the fluid source 406 provides air at about 60 to about 100 psi (about 4.2 to about 7.0 kg/cm2).

In operation, the injection system 402 periodically dispenses and injects a known quantity of catalyst into the FCC unit 424. Catalyst is filled into the low pressure storage vessel 440 through the fill port 442 located in an upper portion of the storage vessel 440. The weight of the storage vessel, including any catalyst residing therein, is obtained by interpreting data obtained from the load cells 410.

In one embodiment, a predefined quantity of catalyst in the storage vessel 440 is transferred into the pressure vessel 420 by selectively opening the control valve 432 for a defined amount of time. After the catalyst has been transferred, the weight of the storage vessel 440 is obtained once again, and the exact quantity of catalyst added determined by subtracting the current weight from the previous measurement. Once the catalyst is transferred to the pressure vessel 420, the pressure inside the pressure vessel 420 is elevated by the pressure control system 428 to, typically, at least about 20 psi. After operating pressure is reached, valves 416 and 426 are opened. This allows fluid supplied by the fluid source 406, typically air at approximately 60 psi, to flow through the pressure vessel 420 and carry the catalyst to the FCC unit 424.

This metering system is advantageous over the prior art in numerous respects. For example, bulk storage of the catalyst at high pressure is not required, thereby allowing the storage vessel 440 to be fabricated less expensively as compared to pressurized bulk storage containers of some conventional systems. Furthermore, as the determination of the amount of catalyst being dispensed is made at the low pressure side of the system 402 (e.g., in the low pressure storage vessel or conduit between the storage vessel and pressure vessel), the pressure vessel 420 does not need to be isolated by bellows in order to obtain catalyst weight information, allowing for more accurate weight readings as well as a more robust and less costly system.

Figure 5:
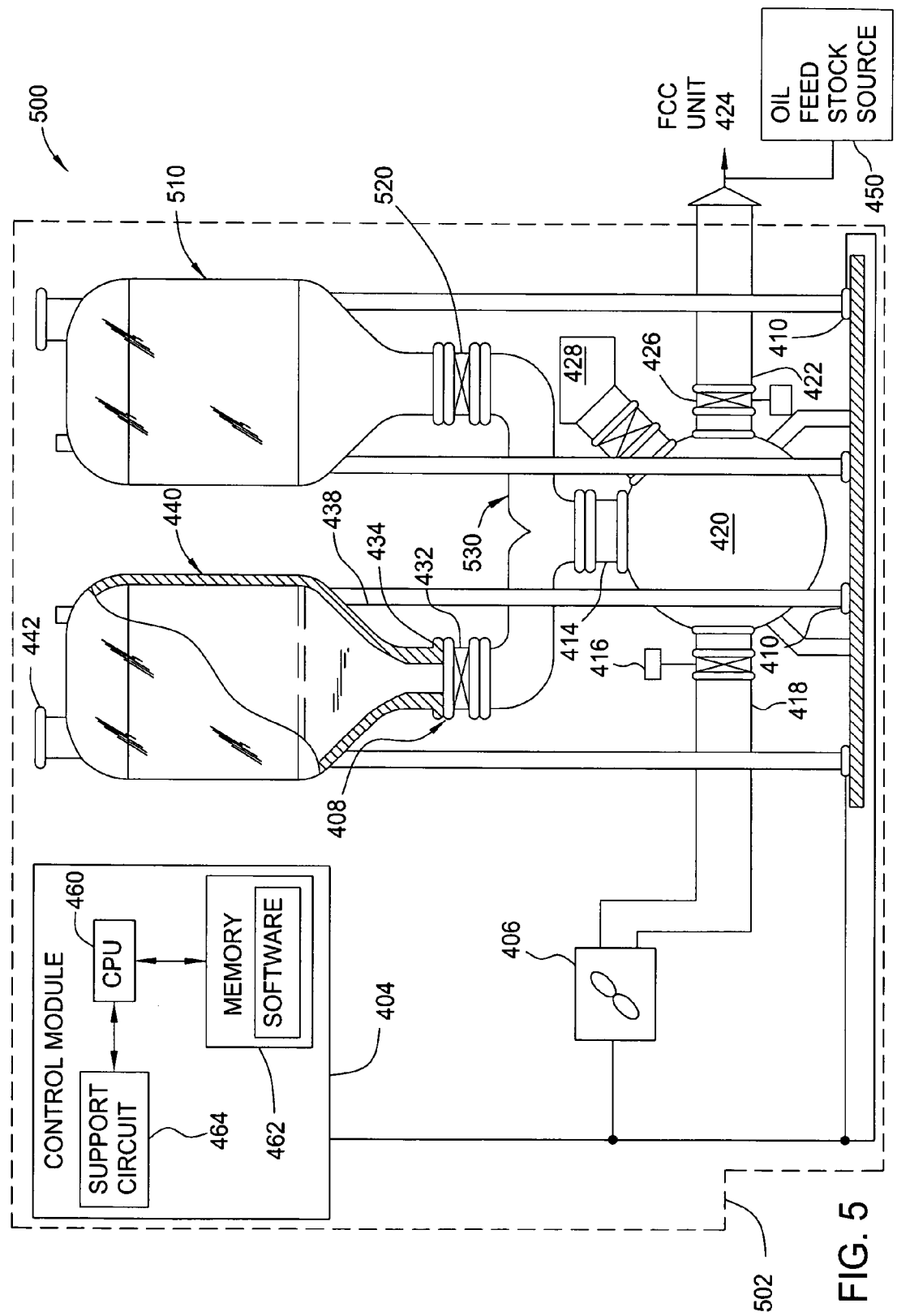
FIG. 5 is a simplified elevation view of a fluid catalytic cracking system illustrating a catalyst metering system in accordance with another embodiment of the present invention.

FIG. 5 depicts another embodiment of a fluid catalytic cracking (FCC) system 500 comprising an injection system 502 and oil feed stock source 450 coupled to an FCC unit 424. The injection system 502 is adapted to provide multiple catalysts to the FCC unit 424. The injection system 502 includes a control module 404 for controlling the rates and/or amounts of catalyst provided to the FCC unit 424 by the injection system 502, a fluid handler 406 for injecting the catalyst into the FCC unit 424, and a pressure vessel 420 coupled to a plurality of storage vessels, illustratively shown in one embodiment as a first low pressure storage vessel 440 and a second low pressure storage vessel 510. It is contemplated that any number of low pressure storage vessels may be coupled to a single pressure vessel 420 for injection catalyst at a higher pressure.

The storage vessels 440, 510 may be configured to deliver the same or different catalysts to the FCC unit 424 and operate substantially similar to storage vessel 440, described above. The storage vessels 440, 510 are coupled to a manifold 530 which directs the plurality of catalysts to a common catalyst delivery line 414 for delivery into the pressure vessel 420. Alternately, each storage vessel 440, 510 can be independently coupled to the pressure vessel 420. Each storage vessel 440, 510 is coupled to an independent metering device 432, 520 which controls the amount of catalyst delivered from each storage vessel 440, 510 to the pressure vessel 420 for injection into the FCC unit 424. In one embodiment, the metering device 520 is configured similar to the metering device 432 described above. In this configuration, the system 502 is capable of sequentially providing catalyst from a predefined one of the storage vessels 440, 510, or alternatively, blending measured amounts from each storage vessel 440, 510 in the pressure vessel 420 for injecting into the FCC unit 424 in a single shot.

Figure 6:
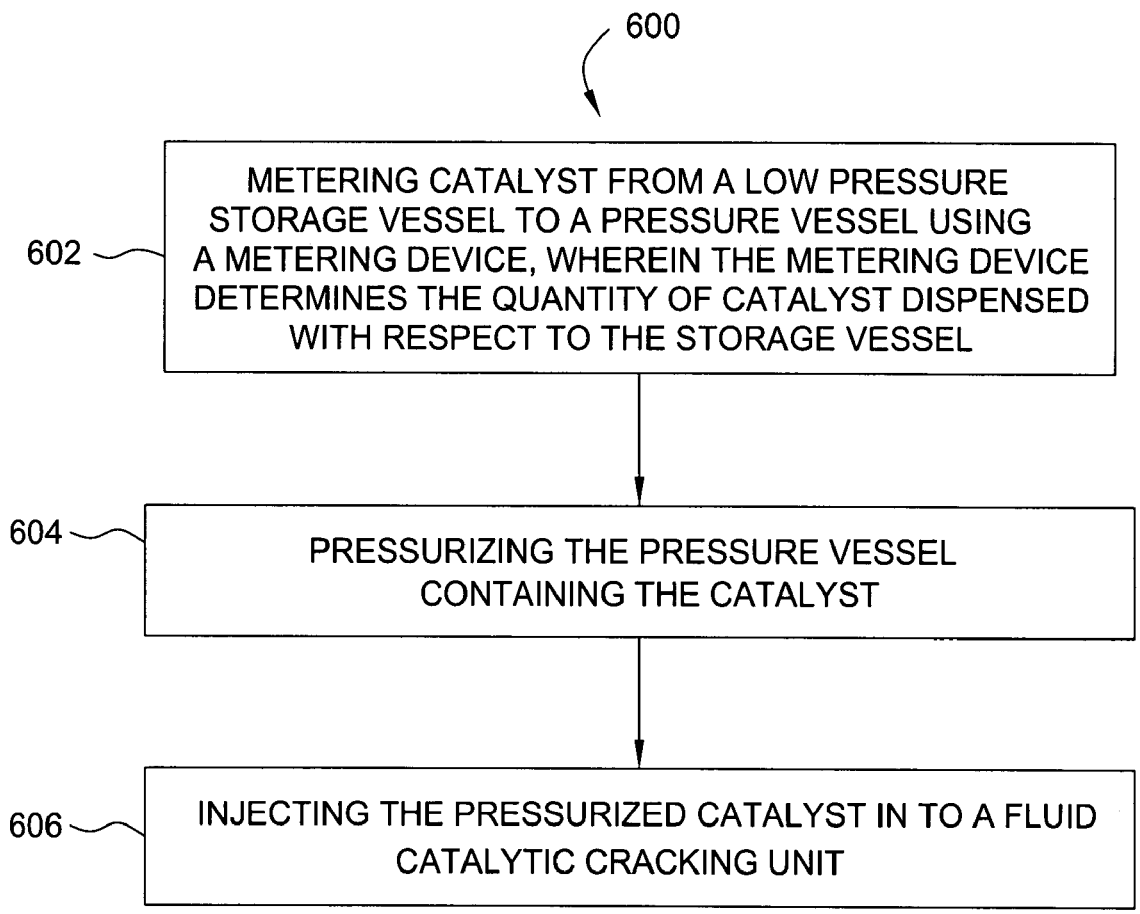
FIG. 6 is a flow diagram representing an inventive method for metering catalyst in a fluid catalytic cracking system.

FIG. 6 depicts a flow diagram of one embodiment of a method 600 for metering catalyst in a FCC catalyst injection system. The method 600 is generally stored in the memory of the control module 404, typically as a software routine. The software routine may also be stored and/or executed by a second CPU (not shown) that is remotely located from the hardware being controlled by the control module 404. Although the method 600 is discussed as being implemented as a software routine, some of the method steps that are disclosed therein may be performed in hardware as well as by the software controller, or manually. As such, the invention may be implemented in software as executed upon a computer system, in hardware as an application specific integrated circuit, or other type of hardware implementation, manually, or a combination of software, hardware, and/or manual steps.

The method 600 begins at step 602 where the catalyst is metered from a low pressure storage vessel 440 to a pressure vessel 420. In this step, the metering and determination of catalyst transferred to the pressure vessel 420 is performed outside the pressure vessel 420 by the metering device 408. For example, in the embodiment depicted in FIG. 4, step 602 is performed by the combination of the metering device 408 and the load cells 410 supporting the storage vessel 440 being utilized to determine the amount of catalyst transferred to the pressure vessel 420. The catalyst is dispensed from the storage vessel 440 into the pressure vessel 420 by temporarily opening the control valve 432. The weight of the storage vessel 440 is measured both before and after dispensing the catalyst by interpreting the output of the load cells 410 coupled to the legs 438 which support the storage vessel 440. The amount of catalyst transferred to the pressure vessel 420 is the difference between the weight of the storage vessel 440 before and after dispensing the catalyst. Alternatively, as discussed above, the catalyst metering device 408 may be a shut-off valve, rotary valve, mass flow controller, pressure vessel, flow sensor, positive displacement pump, or other device suitable for regulating the amount of catalyst dispensed from the storage vessel 440 for delivery to the FCC unit 424.

At step 604, the pressure vessel 420 containing the catalyst is pressurized by the pressure control system 428 to between about 10 to about 100 pounds per square inch. At step 606, the pressurized catalyst is injected into the FCC unit 424. In this step, valves 416, 427 open which allow the catalyst to be carried to the FCC unit 424 in a stream of fluid provided by the fluid source 406. In the embodiment depicted in FIG. 4, the pressure vessel 420 is pressurized to at least about 10 psi by the pressure control system 428. Once the pressure has been reached, valves 416 and 426 are opened, allowing the fluid in the first and second conduits 418, 422 to carry the catalyst into the FCC unit 424.

Figure 7:
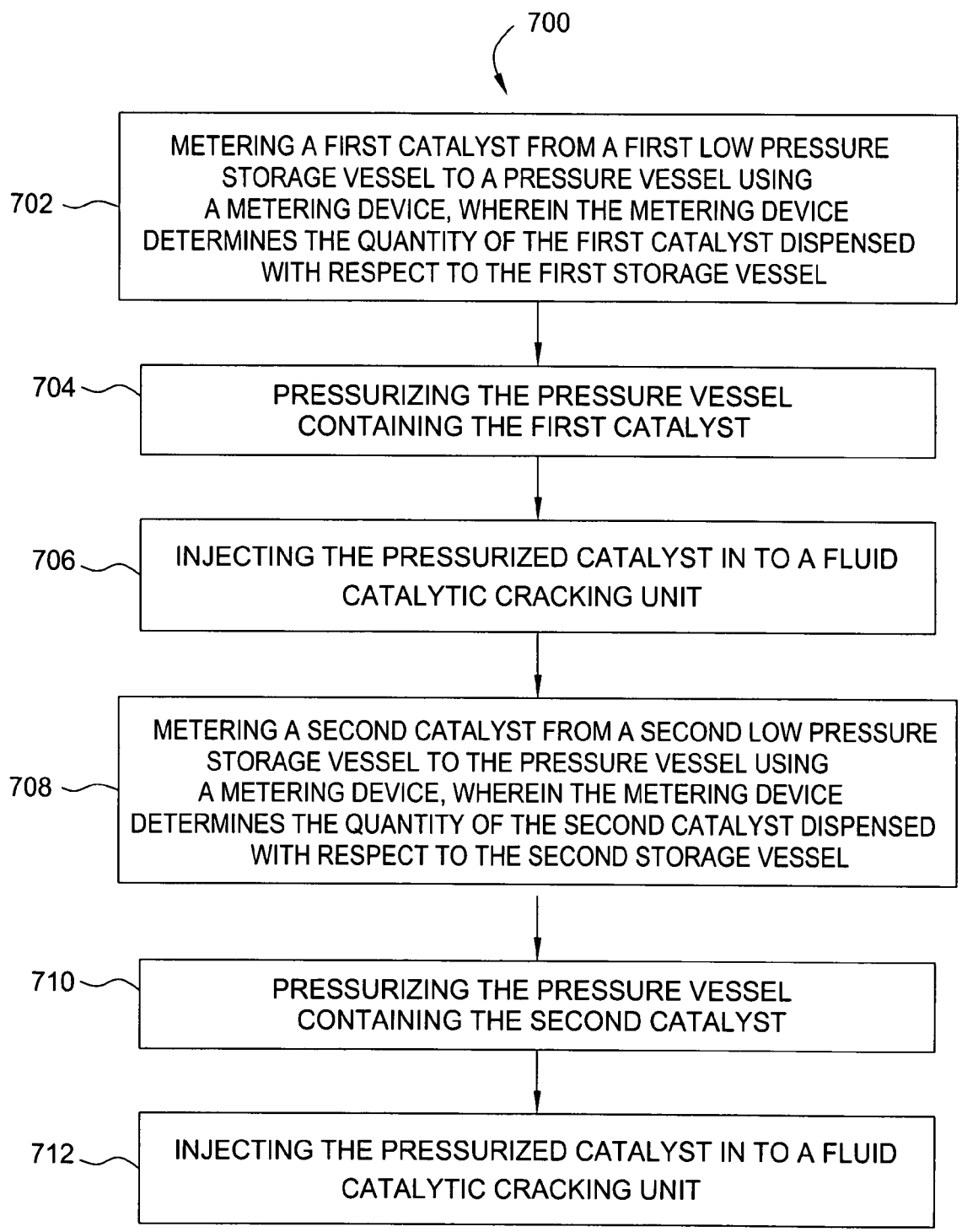
FIG. 7 is a flow diagram of another method for metering catalyst in a fluid catalytic cracking system.

FIG. 7 depicts a flow diagram of one embodiment of a method 700 for metering catalyst in a FCC catalyst injection system. The method 700 begins at step 702 where a first catalyst is dispensed from a first low pressure storage vessel 440 to a pressure vessel 420 using a metering device 432, wherein the metering device determines the quantity of the first catalyst dispensed with respect to the first storage vessel. At step 704, the pressure vessel 420 containing the first catalyst is pressurized. Then, at step 706, the pressurized catalyst is injected into a FCC unit 424.

The method continues at step 708, where a second catalyst is metered from a second low pressure storage vessel 510 to the pressure vessel 420 using a metering device 520, wherein the metering device determines the quantity of the second catalyst dispensed with respect to the second storage vessel. At step 710, the pressure vessel 420 containing the second catalyst is pressurized and finally, at step 712, the pressurized second catalyst is injected into the FCC unit 424. The method 700 contemplates the use of additional low pressure vessels which load the pressure vessel 420 in a predefined order, or as needed.

Figure 8:
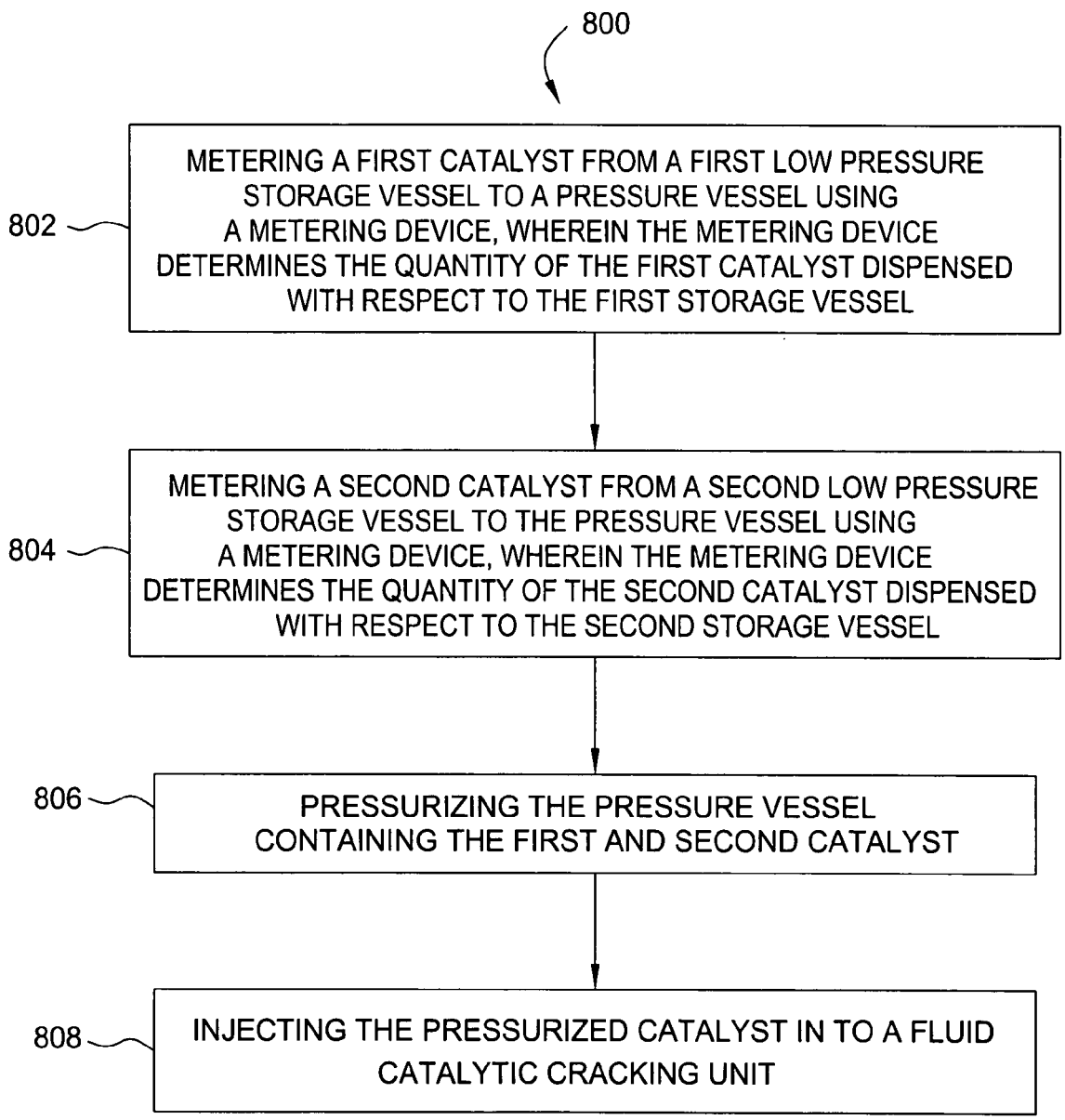
FIG. 8 is a flow diagram of another method for metering a fluid catalytic cracking system.

FIG. 8 depicts a flow diagram of one embodiment of a method 800 for metering catalyst in a FCC catalyst injection system. In this method, beginning at step 802, a first catalyst is metered from a first low pressure storage vessel 440 to a pressure vessel 420 using a metering device 432, wherein the metering device determines the quantity of the first catalyst dispensed with respect to the first storage vessel. At step 804, a second catalyst is metered from a second low pressure storage vessel 510 to the pressure vessel 420 using a metering device 520, wherein the metering device determines the quantity of the second catalyst dispensed with respect to the second storage vessel. At step 806, the pressure vessel 420 containing the first and second catalysts is pressurized and at step 808, the pressurized catalysts are injected into the FCC unit 424 as a single shot of catalyst. The method 800 contemplates the use of additional low pressure vessels which may provide mixtures of different catalyst as needed or per a predefined process sequence.

The methods described in FIGS. 7 and 8 allow for multiple catalysts to be injected into the FCC unit as needed. For example, one catalyst may control emissions from the cracking process and another catalyst may control the resultant product mix produced by the FCC unit. This allows greater process flexibility with reduced capital expenditures.

Figure 9:
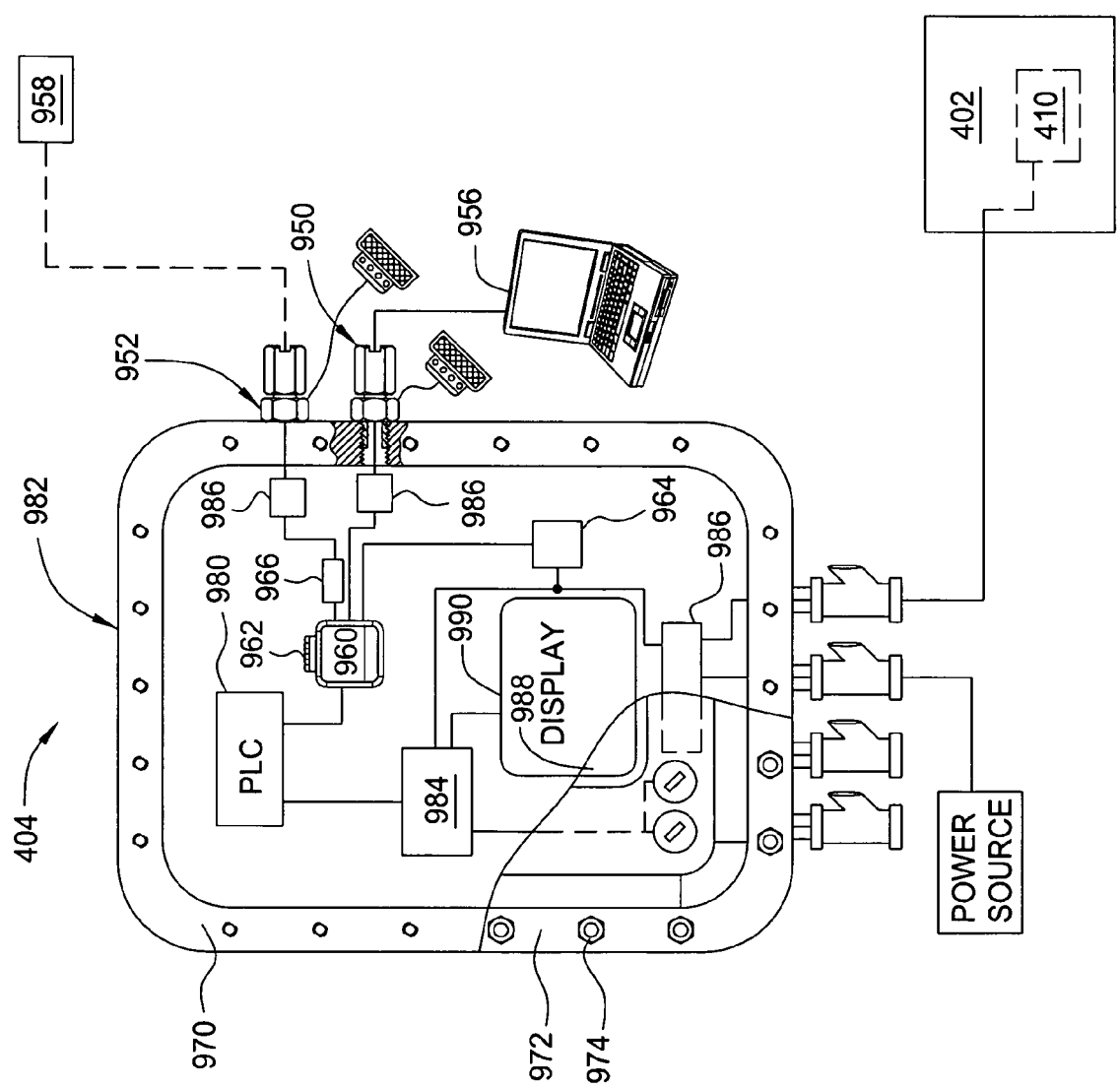
FIG. 9 is a simplified schematic diagram of one embodiment of a control module configured to provide local data access.
Figure 10:
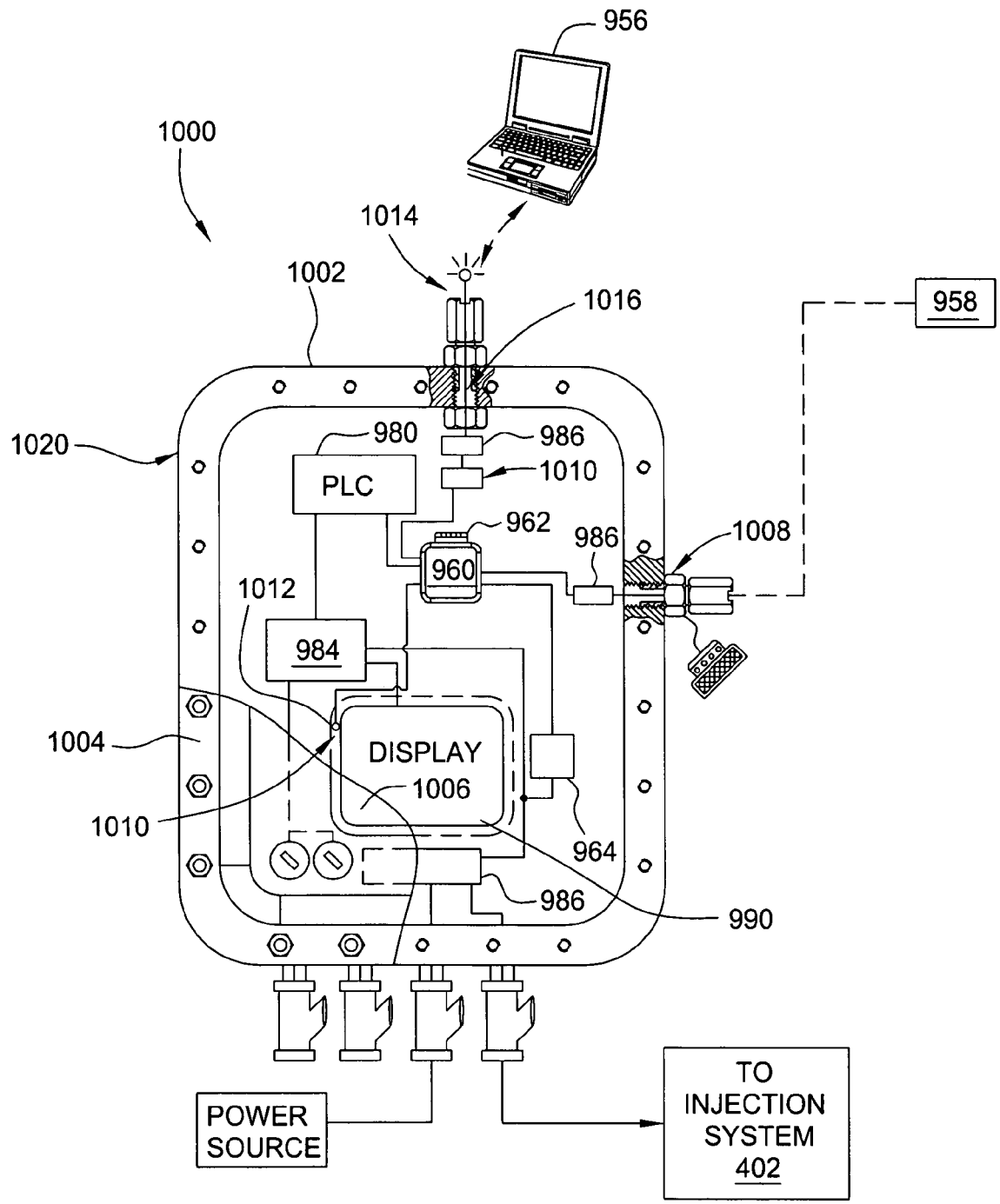
FIG. 10 is a simplified schematic view of another embodiment of a control module configured to provide local data access.

FIGS. 9-10 describe one embodiment of the control module 404. The control module 404 is coupled to the injection system 402 and configured to facilitate local data access of information obtained from the injection system 402. The control module 404 is coupled to the injection system 402 to control the rates and/or amounts of catalyst provided to the FCC unit 424 by the injection system 402.

The control module 404 is housed in an enclosure 982 that is suitable for service in hazardous locations. In one embodiment, the enclosure 982 is fabricated in accordance with NEC 500 Division 1, Class 1, or other similar standard. The enclosure 982 includes a housing 970 having a cover 972 fastened thereto by a plurality of bolts 974. The housing 970 and cover 972 are typically fabricated from cast aluminum and have machined mating services that form a sealed cavity.

The control module 404 includes a controller 980 that may be any suitable logic device for controlling the operation of the catalyst injection system 402. In one embodiment, the controller 980 is a programmable logic controller (PLC), such as those available from GE Fanuc. However, from the disclosure herein, those skilled in the art will realize that other controllers such as microcontrollers, microprocessors, programmable gate arrays, and application specific integrated circuits (ASICs) may be used to perform the controlling functions of the controller 980.

The controller 980 is coupled to various support circuits 984 that provide various signals to the controller 980. These support circuits include, power supplies, clocks, input and output interface circuits and the like. One of the support circuits 984 is coupled to a display 990 that displays process information and/or system status. The display 990 can be viewed through a window 988 disposed in the cover 972 of the enclosure 982. Another one of the support circuits 984 couples the sensors 410 of the system 402 to the controller 980.

In one embodiment, all signals to and from the controller 980 and the support circuits 984 that pass to the exterior of the enclosure 982 must pass through an intrinsically safe barrier 986 to prevent power surges that may potentially ignite fumes present in the environment surrounding the enclosure 982. In one embodiment, the intrinsically safe barrier 986 is a Zener diode that substantially prevents voltage spikes from leaving the enclosure 982. The Zener diode is coupled from a conductive path carrying the signal to or from the interior of the enclosure 982 to ground. As such, any voltage spikes that exceed the breakdown voltage of the Zener diode will be shorted to ground and, thus, not leave the enclosure 982. In embodiments where the risk of explosion is sufficiently reduced, intrinsically safe barriers may be omitted.

The controller 980 typically includes or is coupled to a processor 960 that manages data provided by the sensors 410. In one embodiment, the processor 960 is coupled to the controller 980 and powered by a power source 964 disposed within the enclosure 982. The processor 960 writes information from the system 402 to a memory device 962. The information recorded in the memory device 962 may include data from the sensors 410 indicative of the amount of catalyst injected into the FCC unit 424, error messages from the controller 980, a record of operator activity, such as refilling the addition system, times of manually interrupting and restarting additions, any additions that are made manually which are in addition to any controlled additions, and an hourly weight record of how much catalyst is left in the storage vessel 440, among other information available to the controller 980 regarding activity of the system 402. The memory device 962 may be in the form of a hard disk, a floppy drive, a compact disc, flash memory or other form of digital storage. In one embodiment, the processor 960 is a C-Engine processor manufactured by ADPI, located in Troy, Ohio.

At least a first communication port 950 is coupled through the intrinsically safe barrier 986 to the processor 960 and/or controller 980 to facilitate communication with a device outside the enclosure 982. For example, the first communication port 950 accessible from the exterior of the enclosure 980 may provide access to data stored in the memory device 962. The first communication port 950 may alternatively be utilized to communicate with the controller 980, for example, to revise the ladder logic stored in the PLC. In the embodiment depicted in FIG. 9, the first communication port 950 is coupled to a local device 956, such as a lap top computer or PDA, to access data stored in the memory device 962. The ability to extract and/or access catalyst consumption information and/or other data stored in the memory device 962 of the processor 960 from a local device 956 without having to unbolt the cover 972 from the enclosure 980 to access the memory device 962 eliminates the need for access authorization and the associated downtime involved with opening the enclosure 982.

The first communication port 950 may be a serial port or a parallel port having one or more conductors that penetrate the wall of the enclosure. For convenience, a standard RS-232-type jack that is configured for uses in this environment may be utilized. The first communication port 950 penetrates housing 970 or cover 972 of the enclosure 980 to enable data communications to occur with the controller while the enclosure 980 remains sealed. The processor 960 is programmed in a conventional manner to utilize the first communication port 950.

In the embodiment depicted in FIG. 9, a second communication port 952 may pass through the housing 970 or cover 972 of the enclosure 982. The second communication port 952 is coupled through the intrinsically safe barrier 986 to a modem 966. The modem 966 enables the processor 960 to communicate to a communications network such as a wide area network, thereby allowing the memory device 962 of the processor 960 to be accessed from a remote device 958 over fixed communication lines, such as a telephone line, ISDN, DSL, T1, fiber optic and the like. The modem 966 may also be an Ethernet card coupled to the remote device 958 in the form of a computer network. As such, the remote device 958 may be a server or any computer terminal that interacts with the system 400 via the Internet. Alternatively, the modem 966 may facilitate wireless telephonic/data communication, i.e., the modem may be a wireless modem, such as a wireless communication device using GPRS, CDMA or other standard. In one embodiment, the remote device 958 may be a computer terminal located or accessed by a catalyst supplier or the production facility's inventory controller/planner.

FIG. 10 is a simplified schematic of another embodiment of a control module 1000 configured to provide local data access. The control module 1000 generally includes a housing 1002 and a cover 1004 that define a hazardous duty enclosure 1020 that houses a controller 980. The controller 980 is generally coupled to the injection system 402 through an intrinsically safe barrier 986 disposed in the enclosure 1020.

The controller 980 is coupled to a processor 960 that manages a memory device 962 of the injection system. Local access to the memory device 962 is provided through a wireless transceiver 1030 and a coupler 1014 such as an antenna. The transceiver 1030 is located within the enclosure 1020 and is coupled through the intrinsically safe barrier 986 (if required) to an electrical connector 1016 that penetrates the enclosure 1020. The coupler 1014 is coupled to the connector 1016 on the outside of the enclosure 1020 such that signals can be coupled between a remote device 956 and the processor 960 via the coupler 1014. The remote device 956 may be a lap top computer or PDA that is brought within communication range the coupler 1014. The communication between the remote device 956 and the transceiver 1030 may be accomplished using, for example, a standard IEEE 802.11 protocol or some other wireless data communications protocol.

Alternatively, the coupler 1014 may be disposed within the enclosure 1020 such that signals can be coupled to and from a remote device 956 through a material transmissive to the signal comprising at least a portion of the enclosure 1020. For example, the signal may pass through a window 1006 formed in the enclosure 1020, shown disposed in the cover 1004 in FIG. 10. Alternatively, at least one of the housing 1002 or cover 1004 of the enclosure 1020 may be at least partially fabricated from the material transmissive to the signal between the remote device 956 and the transceiver 1030.

In another embodiment, the transceiver 1030 may be an optical transceiver 1012 positioned within the enclosure 1020 and the coupler 1014 may be an opto-coupler. As such, information may be "beamed" through the window 1006, dispose disposed in the cover 1004. Optionally, the control module 1000 may additionally include a second communication port 1008 accessible from the exterior of the enclosure 1020 that is coupled to the processor 906 via a modem 966. The modem 966 may be alternatively located within the enclosure 1020, for example, as part of a processor running the display 990 or be disposed in another suitable location or device.

Although the injection system 402 described above is shown configured to provide catalyst from a single storage vessel 440, the invention contemplates utilizing one or more injection systems coupled to the FCC unit 424 to introduce multiple catalysts from a plurality of storage vessels, such as, but not limited to, as shown in FIG. 5, each of which may be controlled by common or independent control modules.

In another aspect of the invention, the ability to extract catalyst inventory/use information from the memory device of the processor enables catalyst inventory/usage to be remotely monitored. Thus, catalyst inventory control may be accurately monitored to determine the need for catalyst inventory replenishment at periodic intervals by either the processor's production planner/inventory control or by the catalyst supplier. The inventory control may occur locally, on-site or remotely using the information extracted through the modem. The system may be configured to allow the site operator, vendor, regulatory body or other authorized person to monitor catalyst inventory control, thereby insuring adequate catalyst supply on-site, thereby preventing loss of process control during oil refining due to catalyst shortage.

Figure 11:
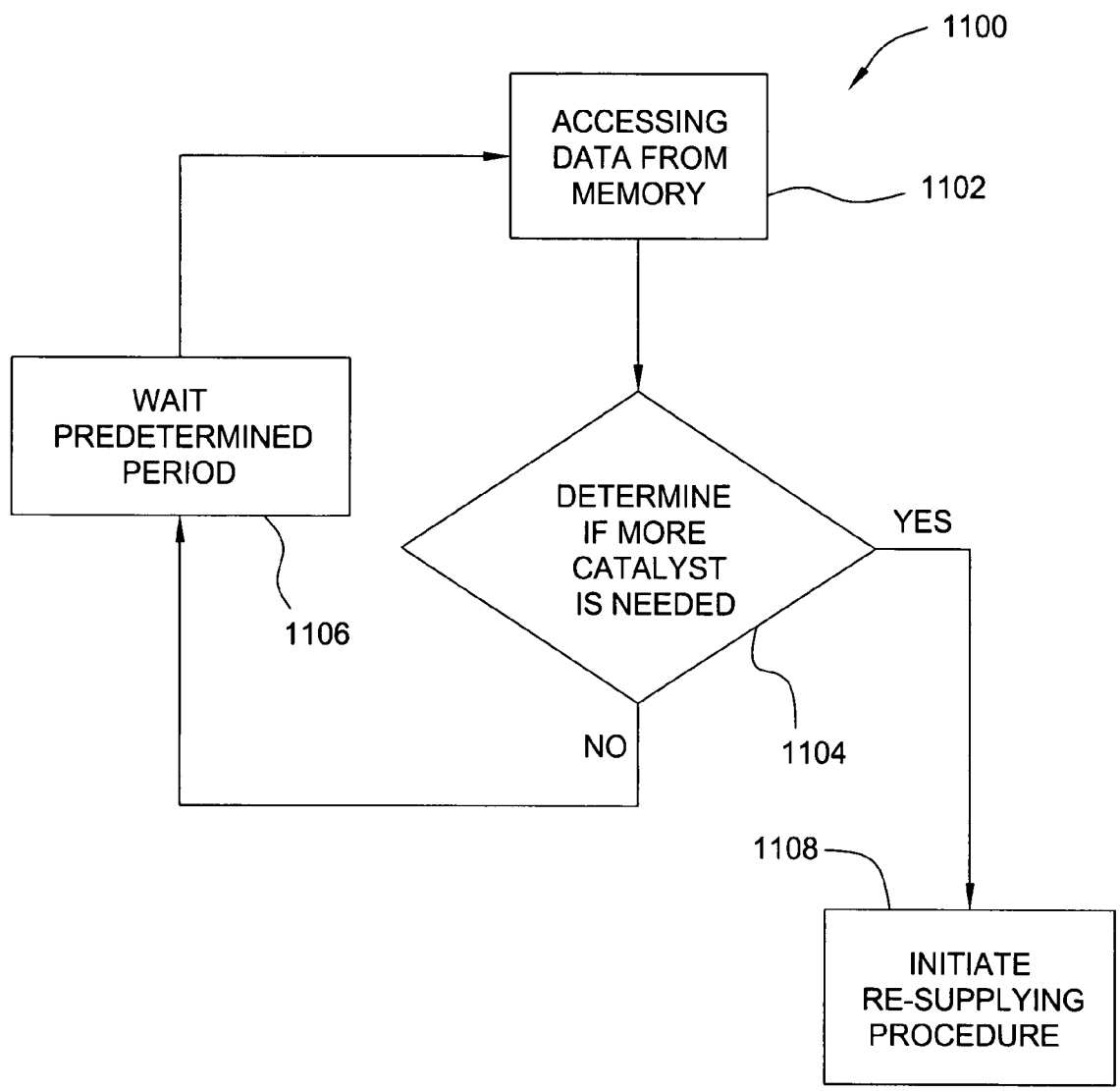
FIG. 11 is a flow diagram of one embodiment of a method for monitoring catalyst inventory/usage.

FIG. 11 depicts a flow diagram of one embodiment of a method 1100 for monitoring catalyst inventory/usage. The method 1100 is generally stored in the memory device 962 or in other memory of the controller 980, typically as a software routine. The software routine may also be stored and/or executed by a second CPU (not shown) that is remotely located from the hardware being controlled by the controller 980. Although the process 1100 is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware.

The method 1100 begins at step 1102 by accessing the data stored in the computer memory device 962. The data may be accessed as discussed above, for example in the injection system 402 depicted in FIGS. 4-5, through either one of the first communication port 950 to a local device 956, such as a lap top computer or PDA, or the communication port 952 to a remote device 958, such as a computer terminal that may be located at the supplier and/or refiner. Step 1102 may be initiated by the local or remote devices 956, 958, or the control module 404.

At step 1104, a determination is made if catalyst inventories are below a predetermined amount, for example, a reorder level. The reorder level is typically set by the refiner's production planner/inventory control and is usually based on planned catalyst consumption, product mix, historical data, catalyst lead times and the like. The reorder level may alternatively be set by the catalyst supplier.

In one embodiment where the bulk storage vessel 440 is the sole source of catalyst, the determination of step 1104 may be made by dividing the remaining inventory by the daily addition rate to yield the remaining days of catalyst left. Catalyst is needed if the number of days of catalyst left is less than a reordering level set by the catalyst delivery lead time plus a margin of safety. Alternatively, the remaining inventory of the catalyst disposed in the bulk storage vessel may be directly compared with a reorder level in the form of the weight of catalyst.

The remaining inventory may be determined in a variety of manners. In one embodiment, the remaining inventory is calculated by subtracting the amount of catalyst dispensed from the bulk storage vessel 440 from the initial amount of catalyst loaded in the bulk storage vessel. In another embodiment, the remaining inventory is calculated by the weight of catalyst remaining in the bulk storage vessel.

In embodiments where the processor has catalyst inventory available in addition to catalyst disposed in the bulk storage vessel 440, the remaining inventory used in the determination must include the catalyst readily available to the refiner along with the catalyst disposed in the bulk storage vessel for comparison to the reorder level. The catalyst readily available to the refiner may include at least one or more of catalyst inventory located on site, warehoused or at another production facility. The catalyst readily available may be keyed into or electronically available to the controller 980, remote device 958 or other equipment executing the software routine embodying the method instructions, and may be obtained from the processors master production schedule (MRP) or inventory control software, receiving records, physical inventory counts and the like. The catalyst readily available must also be reconciled with catalyst transferred to the bulk storage vessel.

If a determination is made that no additional catalyst is needed, a predetermined period is waited at step 1106 before accessing the data to repeat step 1102. The waiting period of step 1106 may be selected to reflect a planned rate of catalyst consumption. The waiting period of step 1106 may alternatively be selected based on the proximity of the site's current catalyst inventory to the reorder level. The waiting period may also be random. In one embodiment, the predetermined period is set to expire at the completion of a selected number of catalyst injections ranging from one to a plurality of injections.

If a determination is made that additional catalyst is needed, a re-supplying procedure is initiated at step 1108. The re-supplying procedure 1108 may vary depending on the entity monitoring the catalyst inventory. For example, if the refiner is monitoring the catalyst inventory, the re-supplying procedure 1108 may include one or more of the steps of moving catalyst inventories between facilities, determining an amount of catalyst to re-order, and placing a catalyst order with the catalyst supplier. If the catalyst supplier is monitoring the catalyst inventory, the re-supplying procedure 1108 is based on a re-supplying protocol established between the catalyst supplier and the refiner.

Figure 12:
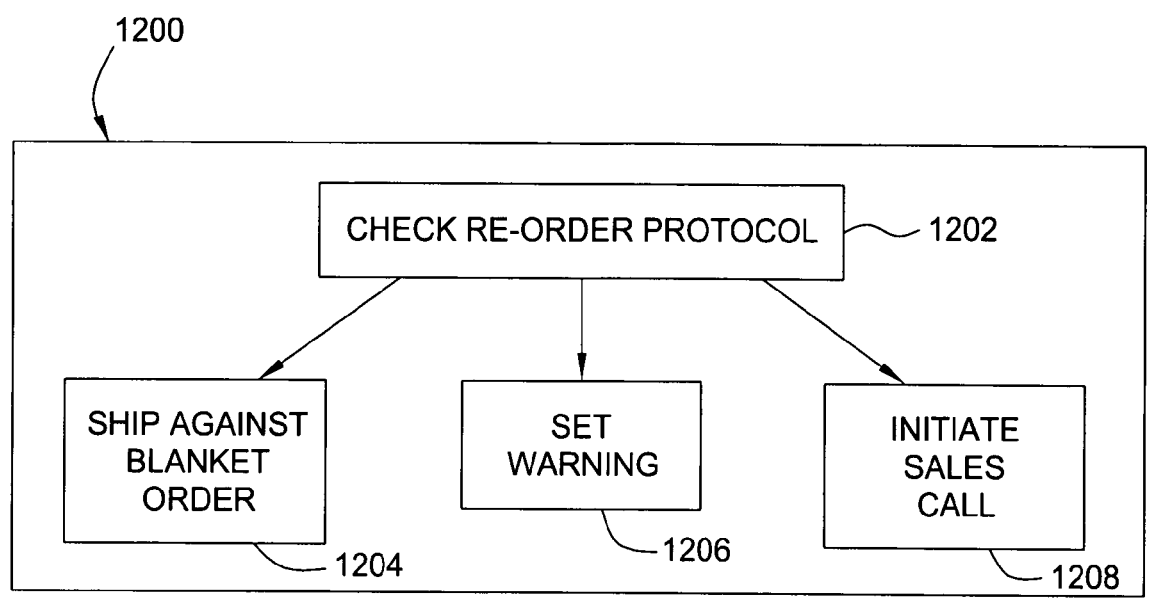
FIG. 12 is a flow diagram of one embodiment of a resupplying procedure.

FIG. 12 is a flow diagram of one embodiment of a re-supplying procedure 1200 that may be utilized by a catalyst supplier or other entity. The re-supplying procedure 1200 beings at step 1202 by checking a re-order protocol established between the buyer (e.g., the refiner) and the supplier. If the protocol instructs the supplier to ship more catalyst against a blanket order when the catalyst inventories are below the reorder level, then a shipment of catalyst is made at step 1204.

If the protocol directs the refiner be notified when the catalyst inventories are below the reorder level, then a warning indicator may be is set (i.e., activated or initiated) at step 1206. The warning indicator may in the form of a warning signal, for example a light and/or sound, on the control module 404, a warning signal activated in a remote location with the refiner, an automatic message, for example, telephonic, wireless or electronic mail, sent to a person (or entity) designated by the refiner (or supplier), or other type of warning indicia for indicating the status of inventory levels. In one embodiment, an electronic warning signal is sent to the refiner, resulting in the automatic generation of a purchase order for additional catalyst.

If the protocol requires notification of the processor's purchasing or planning personnel when the catalyst inventories are below the reorder level, then a sales call by the supplier is initiated at step 1206. The sales call may be initiated by contacting the processor through an automatic telephonic or electronic mail message, or by through a sales call by telephonic, wireless, electronic or personal means.

In another aspect of the invention, the refiner monitors catalyst inventory/use information in-situ and issues a signal indicative of inventory levels. The signal may be directed to the processor for use in reordering catalyst, or to the supplier for initiating re-supplying procedures similar to those discussed with reference to FIG. 12. As the injection system monitors inventory levels in-situ and issues a signal only when catalyst is needed, the number of communications with remote devices are substantially reducing the amount of non-critical data transmitted.

Figure 13:
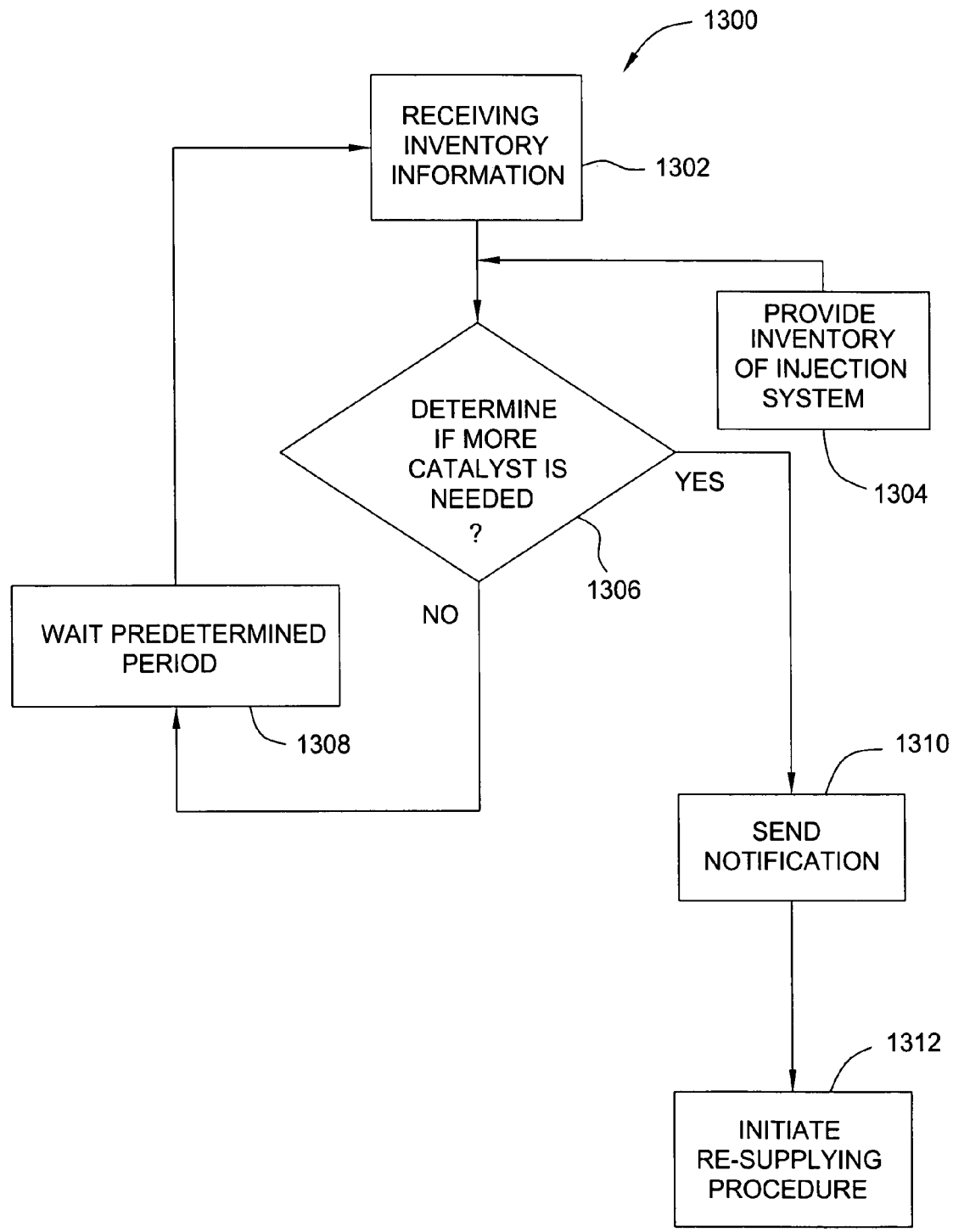
FIG. 13 is a flow diagram of another embodiment of a method for monitoring catalyst inventory/usage.

FIG. 13 is a flow diagram of another embodiment of a procedure 1300 for monitoring catalyst inventory/usage. The procedure 1300 begins at step 1302 by receiving site catalyst inventory information by the controller 980. The controller 980 may receive site inventory information though one of the ports 950, 952, though the control modules operator interface, in one example, the display 990 may be configured as a touch screen, or through exchange of the memory device 962 and the like. The site inventory information is stored in the memory device 962. In one embodiment, the site catalyst inventory information is provided to the memory device 990 from the one of the production planner/inventory controller based on shipments received or ordered. Alternatively, the supplier may update the site inventory information based catalyst shipments made.

At step 1304, catalyst inventory of the injection system 402 is provided to the controller 980 as discussed above. The catalyst inventory of the injection system 402 includes catalyst currently stored in the storage vessel 910 of the injection system 402.

At step 1306, a determination is made by the controller 980 if whether more catalyst is needed. The determination is made by addition of the site catalyst inventory information obtained at step 1302 and the catalyst inventory of the injection system 402 obtained at step 1304 and comparing the sum to a reorder level as discussed above.

If no additional catalyst is needed, the controller 980 waits predetermined period at step 1308 before returning to step 1306. The predetermined period may be set as discussed above, or alternatively, set to include any combinations of catalyst injections, bulk storage vessel 440 refills or updated site catalyst inventory information received by the controller 980.

If additional catalyst is needed, the controller 980 issues a notification at step 1310. The notification may be telephonic signal or message, electronic mail or other message automatically generated and sent through one of the first or second communication ports 950, 952. In one embodiment, the notification is sent to the catalyst supplier.

After the notification at step 1310, re-supplying procedures are initiated at step 1312. The re-supplying procedures are similar to those described above.

The process of monitoring catalyst inventory may also be utilized to confirm how much catalyst is consumed by the processor. For example, the amount of catalyst on site at the last iteration plus the amount of catalyst shipped since then minus the total catalyst injections into the FCC unit over the same period will equal the remaining inventory. Additionally, when the addition history is retrieved, the refilling history data can also be retrieved, which will indicate how many times the system was refilled, and with how much material. This is a useful cross check against physical inventory counts.

The method of monitoring catalyst requirements of a fluid catalytic cracking catalyst injection system facilitates remote inventory monitoring of catalyst utilized in a FCC system. Thus, catalyst inventory control may be accurately monitored to determine the need for catalyst inventory replenishment at periodic intervals by either the processor's production planner/inventory control or by the catalyst supplier.

In one embodiment, the inventive method allows a supplier to initiate re-supplying procedures based on current processing site catalyst inventories without interfacing directly with the processor. The method advantageously prevents the processor from costly having to expedite catalyst delivery or exhausting catalyst supplies, which could result in deviation from planned processing parameters and product mix, loss of process control, and possible production facility shut down.

Figure 14:
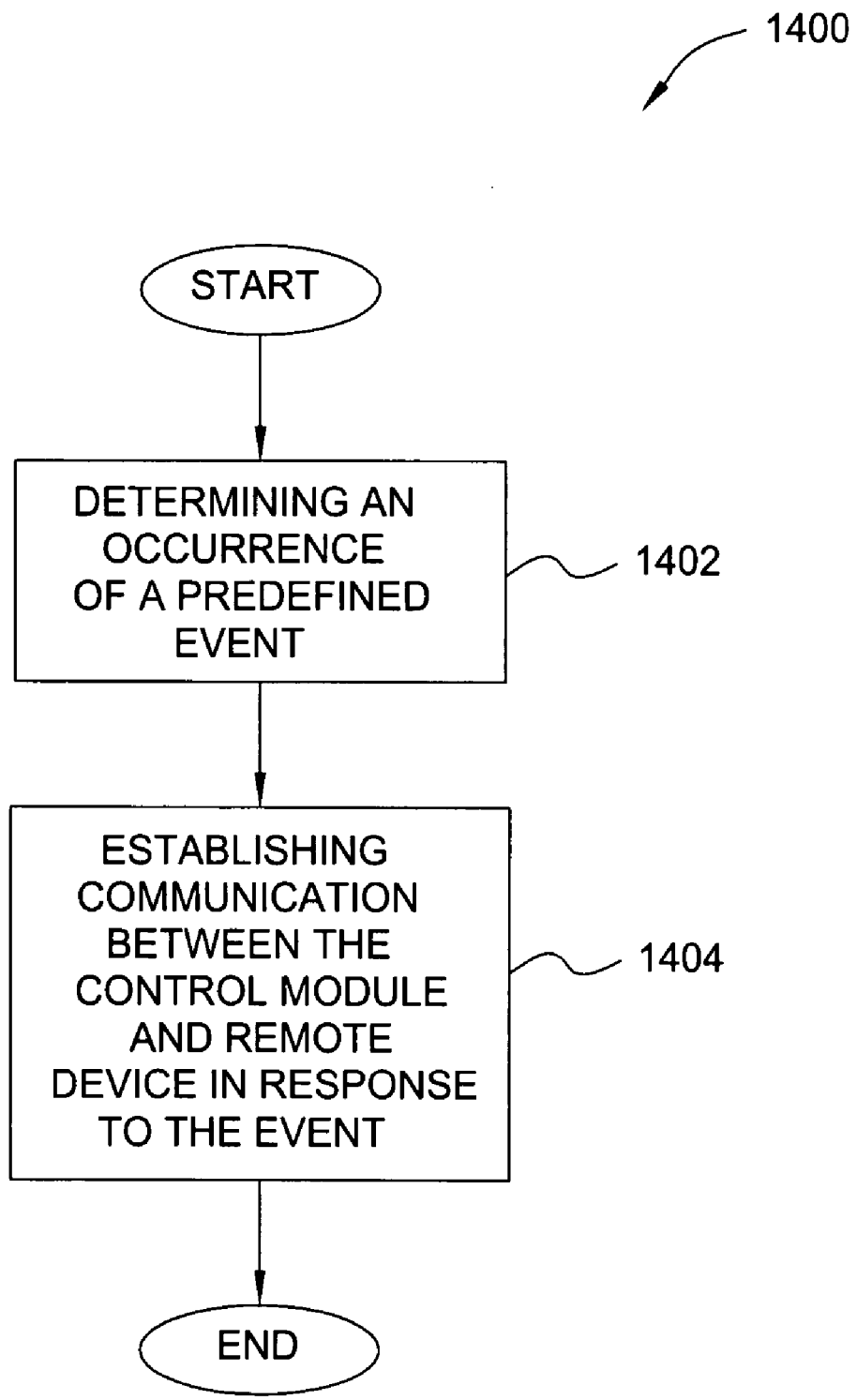
FIG. 14 is a flow diagram of one embodiment of a method for monitoring a catalyst injection system.

FIG. 14 shows a flow diagram of another embodiment of a method 1400 for monitoring an injection system of the present invention. The method 1400 commences at step 1402 in which the controller 980 of the control module 404 determines the occurrence of a predefined event. At step 1404, the controller 980 establishes communication and transmits information between the control module 404 and at least one of a local or remote device, 956, 958 in response to the event. In the context of this invention, an event can be defined as an occurrence or happening that has been identified as having meaningful significance to the operation of the injection system 402. Examples of events include, but are not limited to, a setpoint change, a manual injection of catalyst, a refilling of the storage vessel 440 with catalyst, a blocked or impeded discharge port 434, an unscheduled interruption of the injection process, a recalibration of the injection system 402, a malfunction of the controller 980, a pressure deviation in the storage vessel 440 and/or pressure vessel 420, a pressure deviation within the injection system 402, a pressure deviation within the pressure control system 428 (i.e., a pump malfunction), a deviation in the flow of catalyst from the injection system 402, a deviation from a planned catalyst injection schedule, low catalyst inventory levels, a temperature deviation within the storage vessel 440 and/or pressure vessel 420, a temperature deviation within the injection system 402, a failure of a sensor 410, an injection system alarm, a loss of power in the injection system 402, any controller alarm condition, and the like.

Certain events may be further classified either as a threshold dependent event or a threshold independent event. A threshold dependent event has a metric indicative of the event having a magnitude that is compared to a predefined threshold to determine if the communication, established at step 1404, is triggered. For example, the threshold can be a predefined magnitude, such as a pressure or temperature level. Similarly, the threshold can also be described as a magnitude spectrum, such as a range of pressures or temperatures. The threshold may be a predefined number of event (above and/or below the threshold) occurrences over a specified time period. Events having a magnitude exceeding the predefined threshold are labeled by the controller 980 as a reportable event which trigger the communication of step 1404. For instance, an exemplary threshold dependent event may be the decrease of pressure in the pressure vessel 420 below a predefined pressure level threshold, thereby indicating to the controller 980 of a reportable threshold dependent event. It is also contemplated that it may be desirable to record to the memory device 962 of the control module 404 the occurrences of threshold dependent events which do not rise to the level of a reportable event for later evaluation and analysis, or to be maintained in memory until the number of occurrences gives rise to reportable event.

Other examples of reportable, threshold dependent events include, but are not limited to, a blocked or impeded discharge port 434, a pressure deviation in the storage vessel 440 and/or pressure vessel 420, a pressure deviation within the injection system 402, a pressure deviation within the pressure control system 428 (e.g., a pump malfunction), a deviation in the flow of catalyst from the injection system 402, a deviation from a planned catalyst injection schedule, a temperature deviation within the storage vessel 440 and/or pressure vessel 420, a temperature deviation within the injection system 402, and the like.

A threshold independent event is an event that may be recorded and/or reported without a comparison to a predefined threshold or limit, thereby causing the controller to establish communication at step 1404. More specifically, a threshold independent event can be described as an absolute and definitive incident, or an event that is not based on a comparison with a threshold and can be categorized based on its definitive occurrence. Examples of threshold independent events include, but are not limited to, a loss of power in the injection system 402, a setpoint change, a manual injection of catalyst, a refilling of the storage vessel 440 with catalyst, an unscheduled interruption of the injection process, a recalibration of the injection system 402, a malfunction of the controller 980, a failure of a sensor 410, a deviation from the planned catalyst addition, an injection system alarm, any controller alarm condition, and the like.

If the control module 404 determines that an event has occurred, a message is transmitted to a local or remote device 956, 958 via a communications link at step 1404. This communication link can be embodied in a wireless medium, wire medium, optical medium, or combinations thereof. In one embodiment of the invention, an electronic message or file is sent to a central address of the local or remote device 956, 958. A data harvesting application, stored in the local or remote device 956, 958, is programmed to monitor for these messages from the controller 980 on a continual basis. The application will extract and enter the information from the message into a database stored in the device 956, 958, which is used to identify the specific injection system 402 and the type of information transmitted. In the event urgent action is required, the application may include a notification step wherein at least one of the site operator, catalyst supplier, service technician, or other predefined person, is notified of the problem by directly sending an electronic message to the user's email address or other type of address of the local or remote device 956, 958 (i.e., a warning light, pager, cellular phone, PDA and the like). Furthermore, these persons may be located at the controller, on site, in a remote office, or the like.

In another embodiment, the controller could be enabled to monitor for the recurrence of non-reportable, threshold dependent events. On an individual basis, these lesser events would typically transpire without exceeding a threshold level. However, if the controller 980 recognizes the non-reportable events as being repetitive, it could be programmed to identify the event as a chronic problem, i.e., making the string of non-reportable events into a reportable event. One exemplary scenario would be non-critical pressure fluctuations in the injection system 402. Although these pressure fluctuations would not necessarily eclipse a threshold level, they may serve as an indication of a pump or other system malfunction and signify the need for maintenance. Other examples of non-reportable events include, but are not limited to, the manual change in a catalyst setpoint, the manual addition of catalyst, fluctuations of the indicated weight in the vessel, raw weight sensor readings, sensor drift, and the like.

Figure 15:
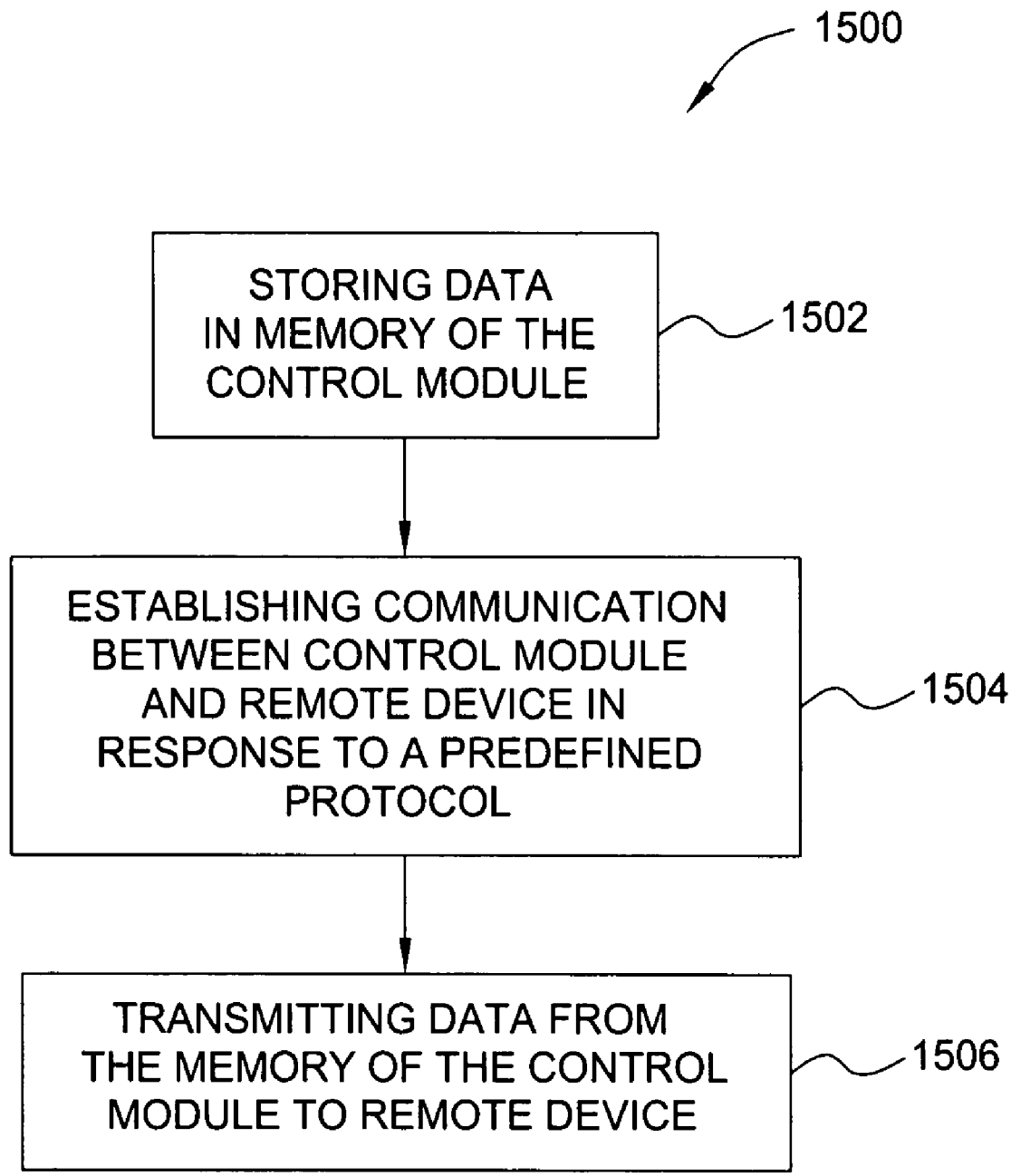
FIG. 15 is a flow diagram of another embodiment of a method for monitoring a catalyst injection system.

Another embodiment of a method 1500 for monitoring an injection system is depicted in FIG. 15. Method 1500 commences at step 1502 where the control module 404 stores the data obtained from the injection system 402 into the memory device 962 of the control module 404. The method 1500 proceeds to step 1504 where communication between the control module 404 and a local or remote device 956, 958 is established in response to a predefined protocol. A predefined protocol is a criteria established to trigger the device 956, 958. One predefined protocol involves communication initiated by the controller to the remote device. This type of protocol is typically initiated when a predefined even occurs and thus prompts the controller 980 to transmit an electronic message to the local or remote device 956, 958. Other instances when the communication originates at the controller 980 includes, but is not limited to, a random inquiry by an on-site technician, or an automatic transmittal of data on a periodic basis. Alternatively, the predefined protocol may be the initiation of communication by the local or remote device to the controller. This direction of communication is initiated in instances where the user of the remote device arbitrarily queries the controller to obtain data. Similarly, a periodic query can also be sent from the local or remote device 956, 958 to automatically request information in accordance with a predefined schedule. After establishing communication, the method 1500 concludes at step 1506 where the data from the control module 404 is transmitted from the memory device 962 to the local or remote device 956, 958.

The method 1500 can also be used to monitor injection system information. Some examples of injection system information include, but are not limited to, the end of day status of the injection system 402, any injection system diagnostic information being recorded, an event log file, and the like. The injection system information can be provided to the user in a number of ways. Namely, the data can be obtained by transmitting a query to the control module 404 from the local or remote device 956, 958 or alternatively, the control module 404 can be programmed to automatically send the information to a local or remote device 956, 958 on a periodic schedule (as discussed above).

Thus, a method of monitoring a fluid catalytic cracking catalyst injection system has been presented which allows for the remote detection of various types of events and occurrences in the injection system 402. Several embodiments have been presented which enable the status and condition of the injection system 402 to be monitored more efficiently by the processor's on-site operator, the catalyst supplier, service technician, or any other appropriate user. Likewise, the method also allows for the direct and automatic transmittal of system information to a local or remote device 956, 958 on a periodic basis.

Thus, an injection system has been provided that facilitates more accurate metering of catalyst and reduces problems associated with bellows used in some injection systems of the prior art. Moreover, the inventive system is compatible with existing low pressure storage vessels and does not require expensive bellows to isolate the pressure vessel. Therefore the inventive system is substantially less expensive than the injection systems of the prior art.

Although the teachings of the present invention have been shown and described in detail herein, those skilled in the art can readily devise other varied embodiments that still incorporate the teachings and do not depart from the scope and spirit of the invention.

What is claimed is:

1. Apparatus for metering catalyst to a fluid catalytic cracking catalyst unit, comprising:
    an enclosure suitable for hazardous locations;
    a low pressure storage vessel;
    a pressure vessel having an outlet adapted to be coupled to a fluid catalytic cracking unit and an inlet coupled to the low pressure storage vessel;
    at least one sensor adapted to provide a metric indicative of catalysts transferred from the low pressure storage vessel to the pressure vessel; and
    a controller disposed in the enclosure for controlling catalyst transferred from the pressure vessel to the catalyst cracking unit, the controller configured for communicating information regarding activity of the apparatus to a device remote from the enclosure while the enclosure is sealed.

2. The apparatus of claim 1, wherein the information is at least one of an amount of catalyst injected into the fluid catalyst cracking unit, error messages from the controller, a record of operator interface with the controller, times of manually interrupting of apparatus operation, times of program resumption, additions that are made manually which are in addition to any automatically controlled additions, record of how much catalyst is left in the low pressure storage vessel, a record of how much catalyst is available to replenish the low pressure storage vessel, or a communication regarding catalyst inventory.

3. The apparatus of claim 1 further comprising:
    an enclosure suitable for hazardous service and housing the controller; and
    a communication port coupled to the controller for communicating the information regarding activity of the apparatus.

4. The apparatus of claim 3, wherein the communication port comprises at least one of a serial port or a parallel port.

5. The apparatus of claim 3, wherein the communication port comprises a wireless transceiver.

6. The apparatus of claim 3, wherein the communication port comprises an optical transceiver.

7. The apparatus of claim 3, wherein the communication port is coupled to the remote device through a window disposed in the enclosure.

8. The apparatus of claim 3, wherein the communication port is coupled to a processor disposed in the enclosure, the processor having a removable memory device.

9. The apparatus of claim 3, wherein the controller further comprises:
    a programmable logic controller having a data port coupled to the communication port.

10. The apparatus of claim 3, wherein the communication port is accessible from an exterior of the enclosure while the enclosure is sealed.

11. The apparatus of claim 1, wherein the controller further comprises:
    a modem coupled to the controller.

12. The apparatus of claim 1, wherein the sensor further comprises:
    at least one load cell adapted to provide a metric indicative of a weight of the low pressure storage vessel.

13. The apparatus of claim 1, further comprising:
    a second low pressure storage vessel; and
    a second metering device coupling the second low pressure storage vessel to the pressure vessel.

14. Apparatus for metering catalyst to a fluid catalytic cracking catalyst unit, comprising:
    a low pressure storage vessel;
    a pressure vessel rigidly coupled to a supporting surface having an outlet adapted to be coupled to a fluid catalytic cracking unit and an inlet;
    a pressure control device coupled to the pressure vessel and configured to selectively pressurize the pressure vessel relative to the low pressure storage vessel;
    a metering device coupling the storage vessel to the in let of the pressure vessel;
    an enclosure suitable for hazardous service;
    a controller disposed in the enclosure for controlling injections made from the low pressure storage vessel; and
    a communication port coupled to the controller for communicating information regarding activity of the apparatus to a device remote from the enclosure while the enclosure is sealed.

15. The apparatus of claim 14, wherein the communication port comprises at least one of a serial port, a parallel port, a wireless transceiver, a modem or an optical transceiver.

16. The apparatus of claim 14 further comprising:
    at least one load cell adapted to provide a metric indicative of a weight of the low pressure storage vessel.

17. The apparatus of claim 14, further comprising:
    a second low pressure storage vessel; and
    a second metering device coupling the second low pressure storage vessel to the pressure vessel.

18. Apparatus for metering catalyst to a fluid catalytic cracking catalyst unit, comprising:
    a storage vessel;
    a metering device coupled to the storage vessel and having an output adapted for coupling to the fluid catalyst cracking unit;
    at least one sensor for providing a metric indicative of the amount of catalyst dispensed through the metering device;
    an enclosure suitable for hazardous service;

a controller disposed in the enclosure and having a memory device for storing catalyst injection information derived from the metric provided by the sensor; and a communication port coupled to the controller for communicating information stored in the memory device to a remote device while the enclosure is sealed.

19. The apparatus of claim 18, wherein the communication port is at least one of a serial port, a parallel port, a wireless broadcast transmitter or an optical transmitter.

20. The apparatus of claim 18 further comprising a modem coupled between the communication port and the controller.

21. The apparatus of claim 18, wherein the memory has stored thereon a plurality of instructions, the plurality of instructions, when executed by the controller cause the apparatus to perform the steps of:

determining if catalyst inventory is available to replenish the supply vessel; and notifying a person or object remote from the apparatus in response to the determination.

22. The apparatus of claim 18, wherein the memory further includes instructions, when executed by the controller, cause the apparatus to perform the steps of:

notifying a catalyst supplier of a need to replenish catalyst inventory.

* * * * *